(12) United States Patent
Chen et al.

(10) Patent No.: US 11,623,657 B2
(45) Date of Patent: Apr. 11, 2023

(54) REMOTE STARTUP OF AUTONOMOUS VEHICLES

(71) Applicant: Nuro, Inc., Mountain View, CA (US)

(72) Inventors: Yanqi Tyson Chen, San Francisco, CA (US); Andrew Joseph Beinstein, Mountain View, CA (US); Francisco Guzman, Mountain View, CA (US); Justin Hong, Berkeley, CA (US); Maxwell Lyman Levenson, Berkeley, CA (US); Ming Yuan Li, Mountain View, CA (US); Zachary Shing-ru Liu, Mountain View, CA (US); Kavi Mehta, Mountain View, CA (US); Emily Anna Weslosky, San Francisco, CA (US); Daniel Whatley, Spring, TX (US); Kuang Long Marcus Yeo, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 304 days.

(21) Appl. No.: 16/934,231

(22) Filed: Jul. 21, 2020

(65) Prior Publication Data

US 2021/0114554 A1    Apr. 22, 2021

Related U.S. Application Data

(60) Provisional application No. 62/916,079, filed on Oct. 16, 2019.

(51) Int. Cl.
*G06Q 50/28* (2012.01)
*B60W 60/00* (2020.01)
(Continued)

(52) U.S. Cl.
CPC ......... *B60W 60/001* (2020.02); *B60R 25/209* (2013.01); *G06F 11/0721* (2013.01);
(Continued)

(58) Field of Classification Search
CPC ............... B60W 60/001; B60R 25/209; G06F 11/0721; G06F 11/0793; G06Q 10/0833;
(Continued)

(56) References Cited

U.S. PATENT DOCUMENTS 9,507,346 B1 * 11/2016 Levinson ............ G06F 3/04847
10,328,873 B2    6/2019 Petersen et al.
(Continued)

FOREIGN PATENT DOCUMENTS

WO    WO-2000030232 A1 *  5/2000

*Primary Examiner* — Vivek D Koppikar
*Assistant Examiner* — Jeffrey R Chalhoub
(74) *Attorney, Agent, or Firm* — Edell, Shapiro & Finnan, LLC

(57) ABSTRACT

Methods are provided for remotely starting up one or a plurality of vehicles. These methods involve starting up hardware and/or software modules of the vehicle in a particular order so as to account for dependencies among the various modules. In one form, states of various hardware and/or software modules in the vehicle, and errors observed in starting up various modules and troubleshooting is applied in an automated manner. Moreover, the methods may involve ensure proper startup of modules for performing a localization procedure for the vehicle.

24 Claims, 15 Drawing Sheets

(51) Int. Cl.
*G06Q 10/0833* (2023.01)
*G08G 1/01* (2006.01)
*G08G 1/00* (2006.01)
*B60R 25/20* (2013.01)
*G06F 11/07* (2006.01)
*G07C 5/00* (2006.01)
*G07C 5/08* (2006.01)
*G06Q 10/0631* (2023.01)

(52) U.S. Cl.
CPC ..... *G06F 11/0793* (2013.01); *G06Q 10/0833* (2013.01); *G07C 5/008* (2013.01); *G07C 5/0825* (2013.01); *G07C 5/0858* (2013.01); *G08G 1/0145* (2013.01); *G08G 1/20* (2013.01); *G06Q 10/06315* (2013.01); *G06Q 50/28* (2013.01)

(58) Field of Classification Search
CPC .. G06Q 10/06315; G06Q 50/28; G07C 5/008; G07C 5/0825; G07C 5/0858; G08G 1/0145; G08G 1/20
See application file for complete search history.

(56) References Cited

U.S. PATENT DOCUMENTS

| | | | |
|---|---|---|---|
| 10,466,705 | B1 | 11/2019 | Garg et al. |
| 10,648,441 | B2 | 5/2020 | Tamane et al. |
| 2018/0257663 | A1* | 9/2018 | Jiang ................ G06F 11/0781 |
| 2018/0297556 | A1 | 10/2018 | Tamane et al. |
| 2018/0347532 | A1* | 12/2018 | Tamane ................ G07C 5/008 |
| 2019/0220036 | A1 | 7/2019 | Weslosky et al. |
| 2019/0227569 | A1 | 7/2019 | Weslosky et al. |
| 2020/0097009 | A1 | 3/2020 | Garg et al. |

* cited by examiner

| Fleet ▼ | Console Status | Vehicle Status | Live Map | Remote Command | | | |
|---|---|---|---|---|---|---|---|
| BOT 1006 | | | Initiation > Localization > Disengagement > Waiting > Complete | | | | |
| BOT 1011 | | | BOT 1027 🔗 Connected ⊙ Manual | | | | |
| BOT 1013 | | | Localizing the vehicle | | | | |
| BOT 1022 | | | Waiting for vehicle to localize | | | | |
| BOT 1026 | | | Info | | Commenting | Diagnostics | |
| Starting Up | 0 < | | | | | | |
| Localization | 2 < | | Have any issues? | | | Start Troubleshooting | |
| BOT 1027 | | | | | Troubleshooting | 33 errors ⊙ | |
| | | | 1210 | | Core | | |
| Disengagement Checks | 0 < | | | | CameraModule | ○ | |
| Waiting for Autonomy | 1 < | | | | x CAMERA_DATA_OK AUTO | | |
| Bot 1044 | | | | | FisheyeModule | ○ | |
| Complete | 0 < | | | | x FISHEYE_INVOCATION_OK AUTO | | |

REMOTE STARTUP OF AUTONOMOUS VEHICLES

CROSS REFERENCE TO RELATED APPLICATION

This application claims priority to U.S. Provisional Application No. 62/916,079, filed Oct. 16, 2019, the entirety of which is incorporated herein by reference.

TECHNICAL FIELD

The disclosure relates to providing remote support for an autonomous vehicle.

BACKGROUND

The handling and delivery of goods and services using autonomous vehicles will improve society, e.g., by allowing people to engage in productive work while waiting for an autonomous vehicle to deliver goods rather than spending time procuring the goods. As the use of autonomous vehicles is growing, the ability to operate the autonomous vehicles efficiently and safely is becoming more important.

BRIEF DESCRIPTION OF THE DRAWINGS

FIGS. 11-14 are examples of user interface screens presented to a user operator in connection with the vehicle startup process, according to an example embodiment.

DESCRIPTION OF EXAMPLE EMBODIMENTS

Overview

Figure 1:
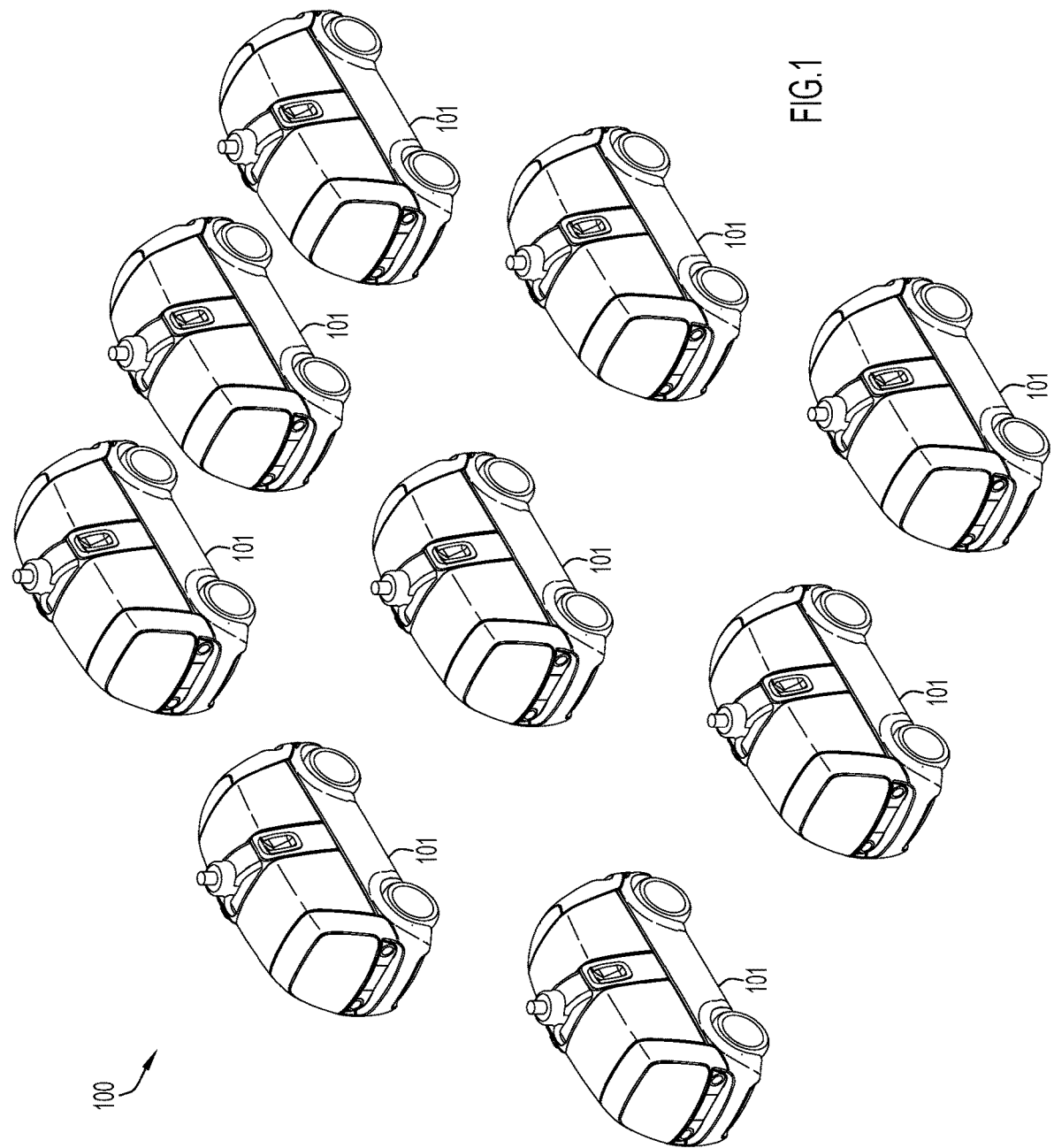
FIG. 1 is a diagrammatic representation of an autonomous vehicle fleet in accordance with an embodiment.

In one embodiment, an interconnected ecosystem provides remote command capabilities that allow for the remote assistance of autonomous, or self-driving, vehicles. The interconnected ecosystem may remotely perform tasks that are generally performed by operations in a vehicle. For example, the interconnected ecosystem may remotely start a vehicle.

To this end, in accordance with one embodiment, a method is provided for remotely starting up one or more vehicles, and including a determination when a successful startup has been achieved for a subset of hardware and/or software modules used to enable the vehicle to perform a localization procedure for determining a location of the vehicle with respect to a three-dimensional context map. The method includes determining a profile that indicates a set of hardware and/or software modules on the vehicle to be started according to the one or more jobs configured for the vehicle, and transmitting to the vehicle a startup command to initiate startup of the vehicle. The startup command includes the profile to be loaded by the vehicle and which causes the vehicle to start up the set of hardware and/or software modules on the vehicle in a particular order. The set of hardware and/or software modules includes a particular subset of hardware and/or software modules used to enable the vehicle to perform a localization procedure for determining a location and orientation of the vehicle with respect to a three-dimensional context map. The method further includes monitoring states of the set of hardware and/or software modules as they are started up, and determining if the particular subset of hardware and/or software modules have been successfully started up. Finally, the method includes initiating the localization procedure when the particular subset of hardware and/or software modules have been successfully started up, in order to determine the location of the vehicle with respect to a three-dimensional context map.

In accordance with another embodiment, a startup method for one or more vehicles is provided by which errors are automatically detected and resolved in order to expedite and improve reliability of the startup process. The method includes determining a profile that indicates a set of hardware and/or software modules on the vehicle to be started according to the one or more jobs configured for the vehicle. As described above, the profile is dependent on the one or more jobs configured for the vehicle. Next, the method includes transmitting to the vehicle a startup command to initiate startup of the vehicle. The startup command includes the profile to be loaded by the vehicle and causes the vehicle to startup the set of hardware and/or software modules on the vehicle in a particular order. The particular order for starting up the set of hardware and/or software modules is based on functional dependencies among the hardware and/or software modules. The method includes monitoring states of the set of hardware and/or software modules as they are started up. The monitoring operation may include obtaining, from the vehicle, status reports indicating one or more errors associated with starting up one or more of the hardware and/or software modules. The method includes determining one or more resolutions for the one or more errors, and transmitting to the vehicle one or more error resolution commands that cause correction of the one or more errors in the one or more hardware and/or software modules of the vehicle.

DETAILED DESCRIPTION

As the use of autonomous vehicles becomes more widespread, the ability to address unforeseen issues with the autonomous vehicles is increasing in importance. For example, when an autonomous vehicle breaks down or otherwise can no longer operate safely, the ability to provide remote assistance to the autonomous vehicle may allow the autonomous vehicle to effectively be efficiently repaired. As a result, downtime associated with an autonomous vehicle may be substantially minimized.

A fleet of autonomous vehicles may be part of an interconnected or remote command ecosystem that allows the fleet to be remotely commanded, e.g., when there is an unexpected situation, and may also allow the fleet to be substantially prepared for service remotely. In one embodiment, the startup of the fleet of autonomous vehicles may be automated such that multiple autonomous vehicles in a fleet may be remotely commanded to startup at substantially the same time.

For purposes of the description presented herein, the following definitions are provided. The term "vehicle" used herein may refer to a land-based vehicle, such as, for example, a vehicle that is configured to travel on or with respect to public streets and roads. The vehicle may be propelled by any technology now known or hereinafter developed, such as an internal combustion engine, electric motor, hybrid internal combustion engine/electric motor, etc.

A vehicle may be "fully autonomous" in that it may be configured to be driven without any assistance from a human operator either within the vehicle or remote from vehicle. Moreover, a "fully autonomous vehicle" may have no human occupant or it may have one or more human occupants, but those human occupants are not involved with the operation of the vehicle; they may simply be passengers in the vehicle.

A vehicle may be "semi-autonomous" in that it uses some level of human interaction in controlling the operation of the vehicle, whether through remote control by a human operator or local control within the vehicle by a human operator.

A vehicle may be "non-autonomous" in that it is driven by a human operator within the vehicle.

Moreover, some vehicles may be configured to switch between a fully autonomous mode to a semi-autonomous mode, and vice versa. Further still, some vehicles may be configured to switch between a non-autonomous mode and one or both of the fully autonomous mode and semi-autonomous mode.

While the following description refers primarily to fully autonomous vehicles, it is to be understood that the vehicle startup techniques presented herein have applicability to vehicles that are fully autonomous, semi-autonomous or non-autonomous, or which have the ability to switch between any two or more of fully autonomous, semi-autonomous or non-autonomous modes.

Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
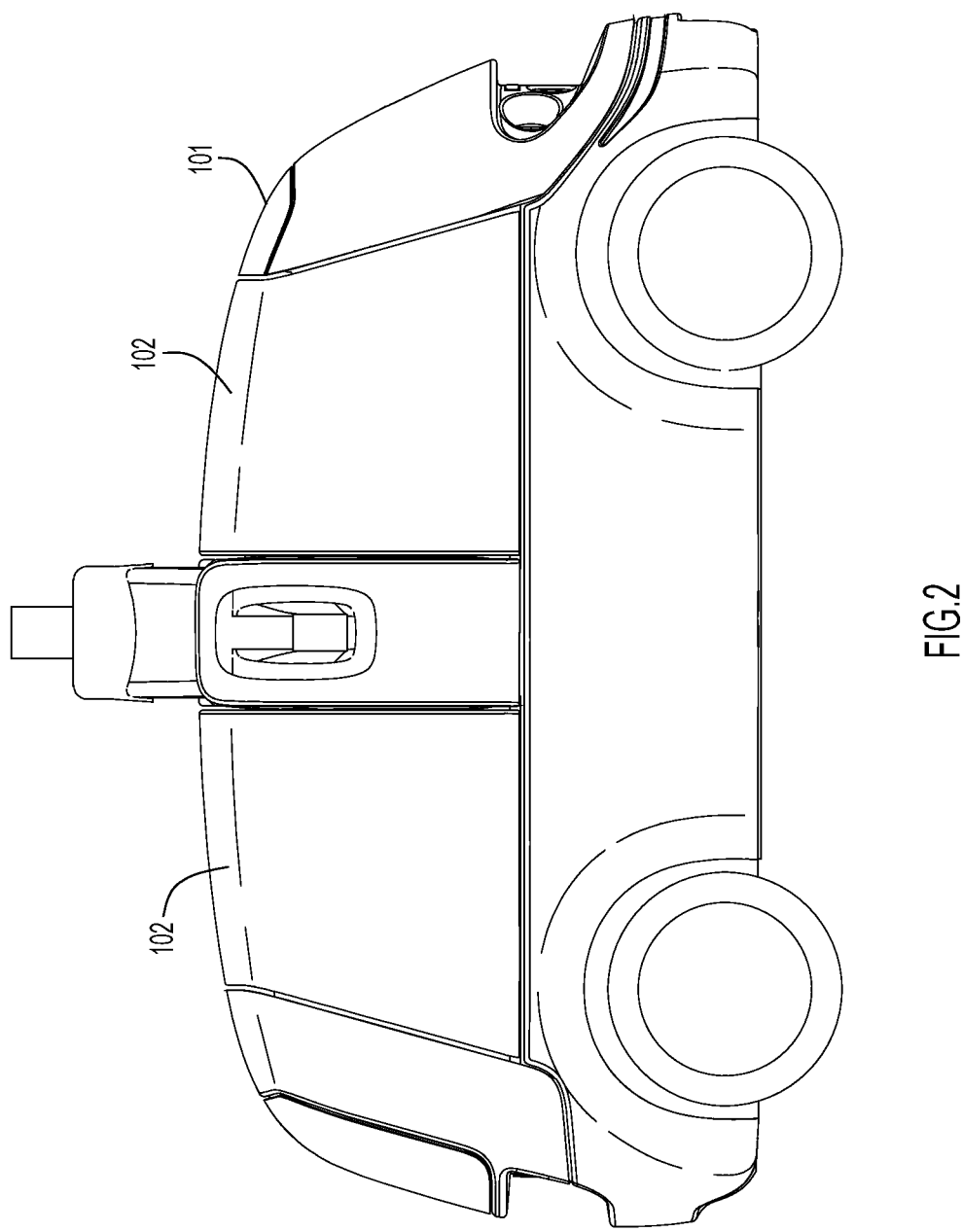
FIG. 2 is a diagrammatic representation of a side of an autonomous vehicle in accordance with an embodiment.

FIG. 2 is a diagrammatic representation of a side of an autonomous vehicle, e.g., one of the autonomous vehicles 101 of FIG. 1, in accordance with an embodiment. Autonomous vehicle 101, as shown, is a vehicle configured for land travel. The autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in a range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
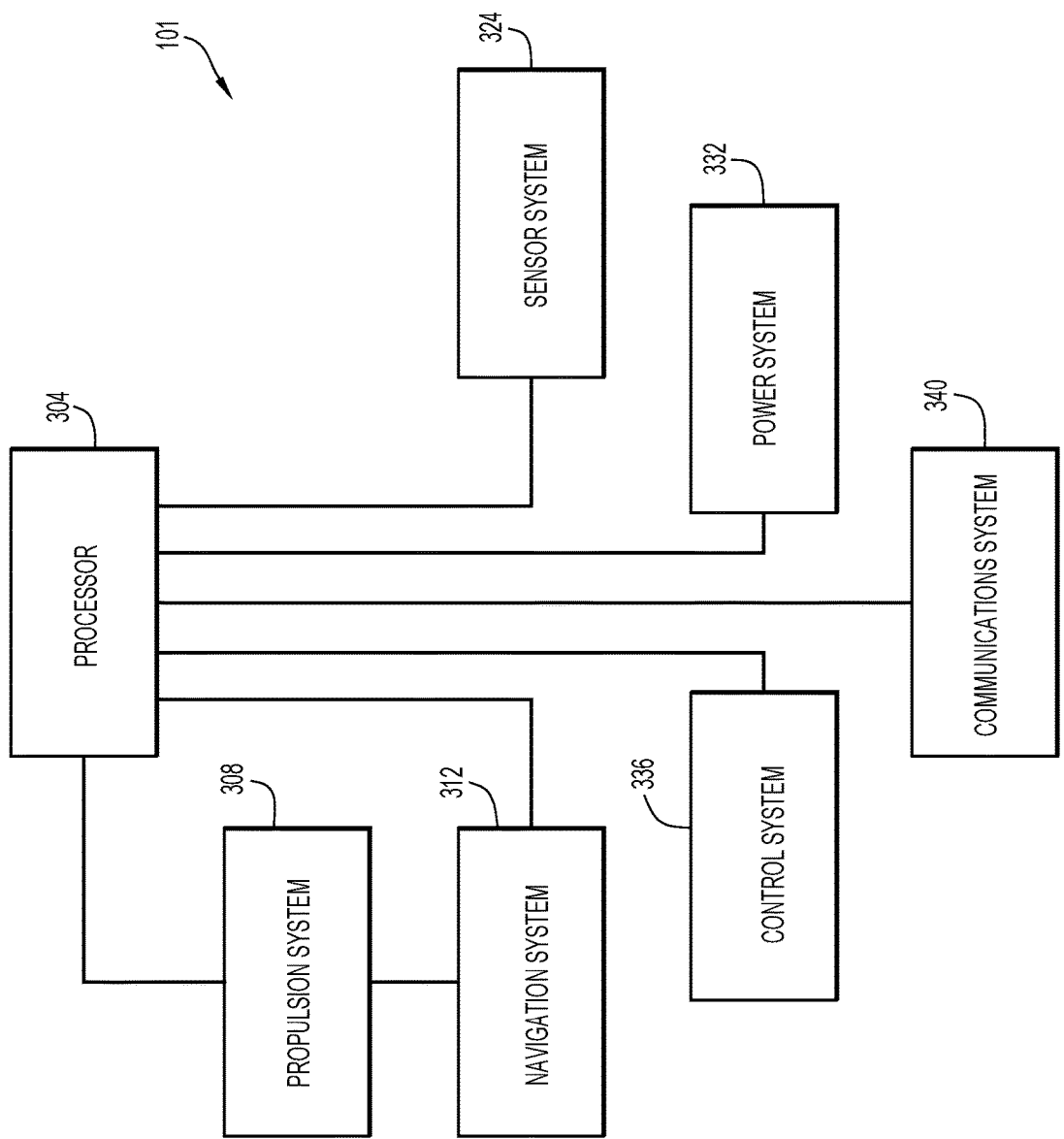
FIG. 3 is a block diagram representation of functional components of an autonomous vehicle in accordance with an example embodiment.

FIG. 3 is a block diagram representation of the various systems of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In one embodiment, propulsion system 308 is arranged to be activated remotely, as for example by a remote command ecosystem as described below. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments.

Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment. In one embodiment, navigation system 312 includes an autonomous vehicle stack that allows autonomous vehicle 101 to operate autonomously. As will be described in more detail below, the autonomous vehicle 101 uses a highly detailed 3-dimensional map (called a contextual map herein) in order to be able to travel autonomously on streets/roads throughout a metropolitan area.

Sensor system 324 may include a variety of sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand. The communication system may include wireless local area network (WLAN) connectivity, wireless wide area network connectivity (e.g., cellular) and any other wireless or mobile communication capability now known or hereinafter developed to enable communication between the autonomous vehicle 101 and a remotely located control system.

Allowing autonomous vehicles, such as robots in a fleet, to be remotely commanded may increase the efficiency with which the autonomous vehicles may be used, and may also reduce downtime associated with autonomous vehicles which are beset with issues that affect the use of the autonomous vehicles. In one embodiment, a remote command ecosystem that is part of an autonomous vehicle platform is arranged to remotely assist autonomous vehicles. The remote command ecosystem may include, but is not limited to including, functionality that may generally be performed by a human driver such as the ability to start a vehicle, the ability to troubleshoot issues with the vehicle, the ability to take control after overriding autonomous control of a vehicle, the ability to navigate an emergency, and the ability to handle customer support issues.

Figure 4:
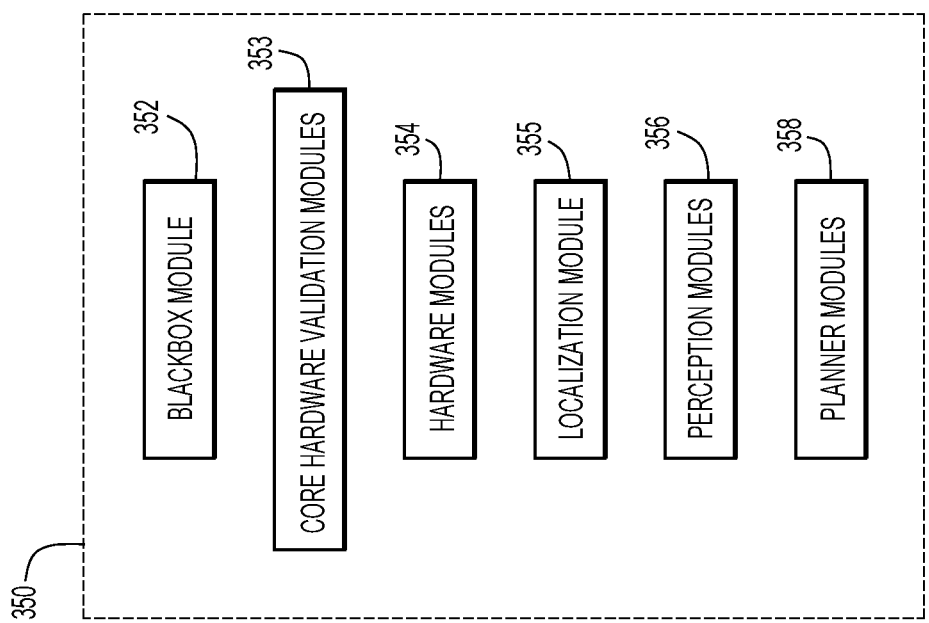
FIG. 4 is a diagram depicting examples of various hardware and software modules of an autonomous vehicle, according to an example embodiment.

The various systems shown in FIG. 3 may be grouped by function. When remotely starting the vehicle 101, there are certain dependencies that are accounted for in order to expedite and optimize the reliability of the remote startup process of the vehicle. To this end, reference is now made to FIG. 4. FIG. 4 illustrates various hardware and/or software modules 350 of the vehicle 101. The hardware and/or software modules 350 may encompass functions across one or more of the systems shown in the block diagram of FIG. 3. The hardware and/or software modules 350 include a Blackbox module 352, core hardware validation modules 353, other hardware modules 354, localization module 355, perception modules 356 and planner modules 358.

The Blackbox module 352 serves as a log in which are recorded events observed and associated with operation of the autonomous vehicle.

The core hardware validation modules 353 include core hardware modules on the vehicle, such as graphical processor unit (GPU), LiDAR sensors, video cameras, calibration parameters, body control module (BCM), brain stem computing (BSC) module, pose module, etc. The pose module acts as a source of system data for all the other modules, and provides raw data about counters and timers running on the autonomous vehicle.

The hardware modules 354 may include an audio capture module that captures audio surrounding the vehicle, a context map validation module that validates the context map, LiDAR driver, radar detection module, sensor pod validation, system monitoring module that includes monitoring for disk storage space, memory, system clock, etc., among the computing resources of the autonomous vehicle.

The localization module 355 include functions to validate that the vehicle has precisely determined its location within the context map. Localization needs to be completed before the autonomous vehicle can begin autonomous operation because failure to precisely determine the location within the context map can result in the vehicle colliding with obstacles and/or not properly traveling on streets/roads.

The perception modules 356 are hardware or software functions that identify and understand the things (called "agents") that are around the autonomous vehicle. The perception modules 356 may include geometric detection capabilities to property detect agents of different geometric shapes, detecting and classifying traffic signals and signage, predicting whether and in which direction an agent will move, detecting emergency vehicle alerts (sirens), etc.

The planner modules 358 are hardware or software functions that determine what the autonomous vehicle should do based on detection of particular agents by the perception modules 356, including taking the appropriate street navigation action.

As will be described further below, there are some dependencies between the various modules depicted in FIG. 5, and as such, the vehicle 101 may be started more expeditiously and reliably by taking into account these dependencies.

Figure 5:
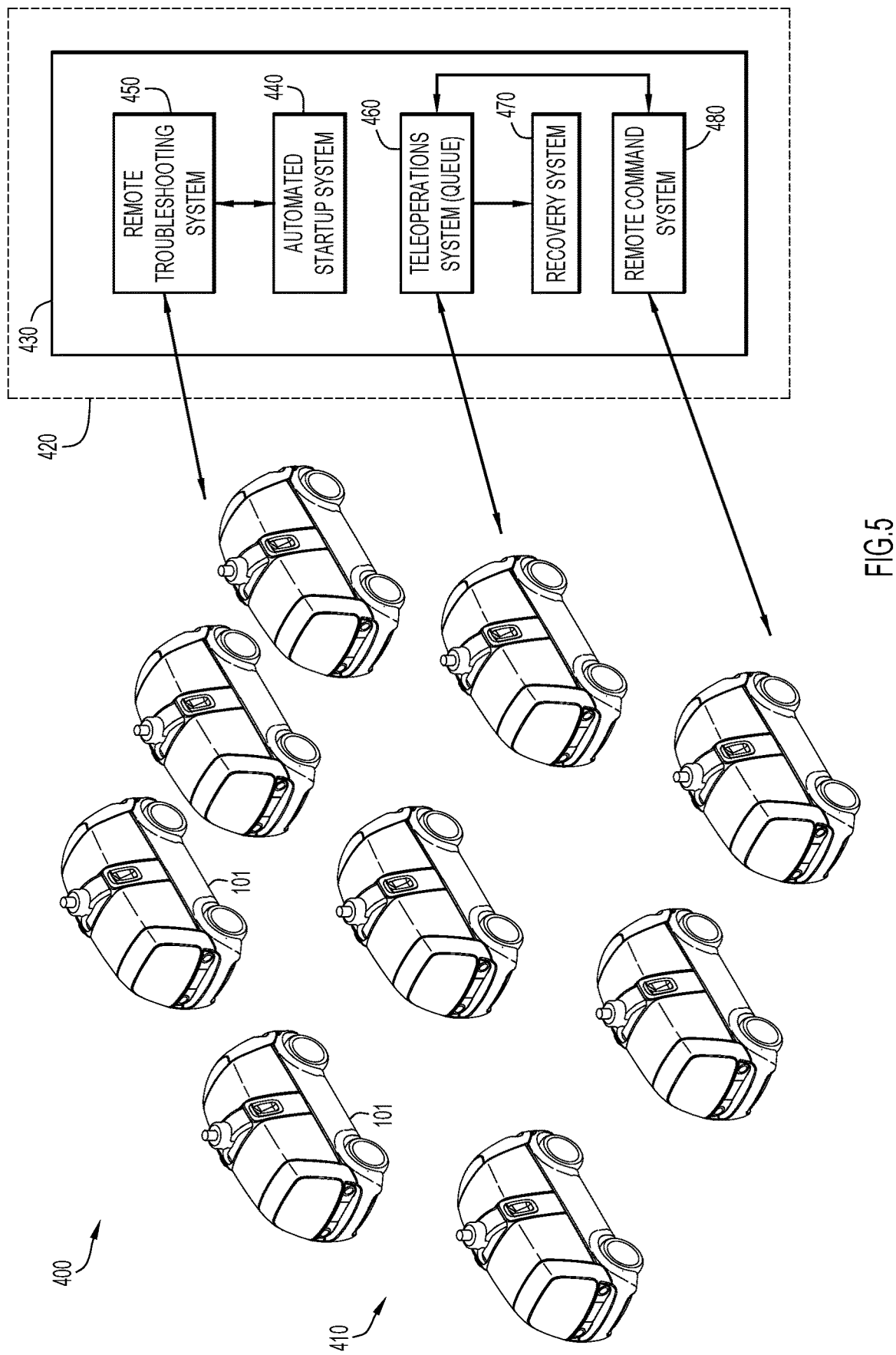
FIG. 5 is a diagrammatic representation of an autonomous vehicle platform that includes a remote command ecosystem in accordance with an embodiment.

With reference to FIG. 5, an autonomous vehicle platform that includes a remote command ecosystem is described in accordance with an embodiment. An autonomous vehicle platform 400 includes a fleet 410 of autonomous vehicles 101, and a control system 420 that generally provides fleet operation capabilities that coordinate the activity and positioning of autonomous vehicles 101 in fleet 410. The fleet operation capabilities also generally encompass communicating with an owner or operator of fleet 410, as well as with vendors and customers. It should be appreciated that control system 420 may be implemented in part as either a distributed server system, or a central server system. In one example, the control system 420 resides in the cloud and a user operator may log in to, and use, the control system 420 from any user device that has a web browser. A remote command ecosystem 430 is generally part of control system 420, and includes an automated startup system 440, a remote troubleshooting system 450, a teleoperations system 460, a recovery system 470, and a remote command system 480.

Automated startup system 440 is arranged to remotely start vehicles 101. By way of example, automated startup system 440 may effectively turn on multiple vehicles 101 substantially simultaneously such that vehicles 101 are prepared to drive or to otherwise propel themselves by substantially simultaneously sending signals to vehicles 101. Automated startup system 440 may also generally start an autonomous vehicle stack. If vehicles 101 are electric vehicles, activating multiple vehicles 101 may generally involve causing power to be provided to the electric motors of vehicles 101. In one embodiment, automated startup system 440 is configured to allow "one-click" remote startup of one vehicle 101 or multiple vehicles 101 substantially simultaneously.

That is, with a substantially single action such as the single click of a button, one or more vehicles 101 may be started. It should be appreciated that automated startup system 440 may be configured to shut down a vehicle 101.

In general, automated startup system 440 is a streamlined vehicle startup interface which aggregates steps associated with starting one or more vehicles 101, or otherwise bringing one or more vehicles 101 online. Automated startup system 440 may include a user interface that provides information about each vehicle 101 such that a determination may be made as to whether each vehicle 101 is ready to be started up. The information provided may include, but is not limited to including, an indication of whether each vehicle 101 is configured for an assigned job and whether each system within each vehicle 101, e.g., hardware systems and a perception system, is in a desired state. Further details for the automated startup system 440 are described below.

Remote troubleshooting system 450, which is in communication with automated startup system 450, is arranged to obtain information from vehicles 101 that indicates whether any vehicles 101 have issues, e.g., health issues, that are affecting, or about to affect, the ability of vehicles 101 to function. Remote troubleshooting system 450 may use data obtained from a potentially unhealthy vehicle 101 diagnose issues with the potentially unhealthy vehicle 101.

Teleoperations system 460 generally allows vehicles 101 to be operated remotely. Teleoperations system 460 may maintain a queue that lists vehicles 101 which are to be remotely operated, e.g., due to issues with vehicles. In one embodiment, teleoperations system 460 includes communication/processing equipment and at least one human operator station which has a driver seat, a steering wheel, acceleration and brake pedals, a gear shifter, and a visual interface that is configured to allow a human operator to view the environment in which a vehicle 101 that is to be driven or otherwise controlled by the human operator station is driving. Through teleoperations system 460, requests from vehicles 101 to take control may be obtained and accepted. For example, teleoperations system 460 may effectively seize control from a vehicle 101 until the vehicle 101 is able to re-engage in autonomy.

In the event that vehicles 101 that are remotely driven using teleoperations system 460 are unable to re-engage in autonomy, teleoperations system 460 communicates with recovery system 470. Recovery system 470 maintains a record of vehicles 101 that are unable to operate autonomously, and may notify a recovery team of locations of such vehicles 101, and also provide an indication of the issues afflicting such vehicles 101.

Remote command system 480 is generally arranged to provide visibility into issues relating to vehicles 101. In one embodiment, remoted command system 480 maintain a list of vehicle assignments, and may provide a real-time view of vehicle health.

In general, an autonomous vehicle in a fleet may be assigned to complete a particular job or task, also called a "mission". For example, a job manager function may obtain a list of jobs to be completed by a fleet of autonomous vehicles, and then may assign specific jobs to certain vehicles. Jobs may be assigned or otherwise allocated to different vehicles based on factors including, but not limited to including, the locations of the vehicles, the destinations associated with the jobs, the cargo capacity of the vehicles, the configuration of the vehicles, and/or the travel ranges of the vehicles. It should be appreciated that the types of jobs to be undertaken by an autonomous vehicle may vary widely, and may include, but are not limited to including, delivery jobs or other jobs that involve the transport of goods.

Figure 6:
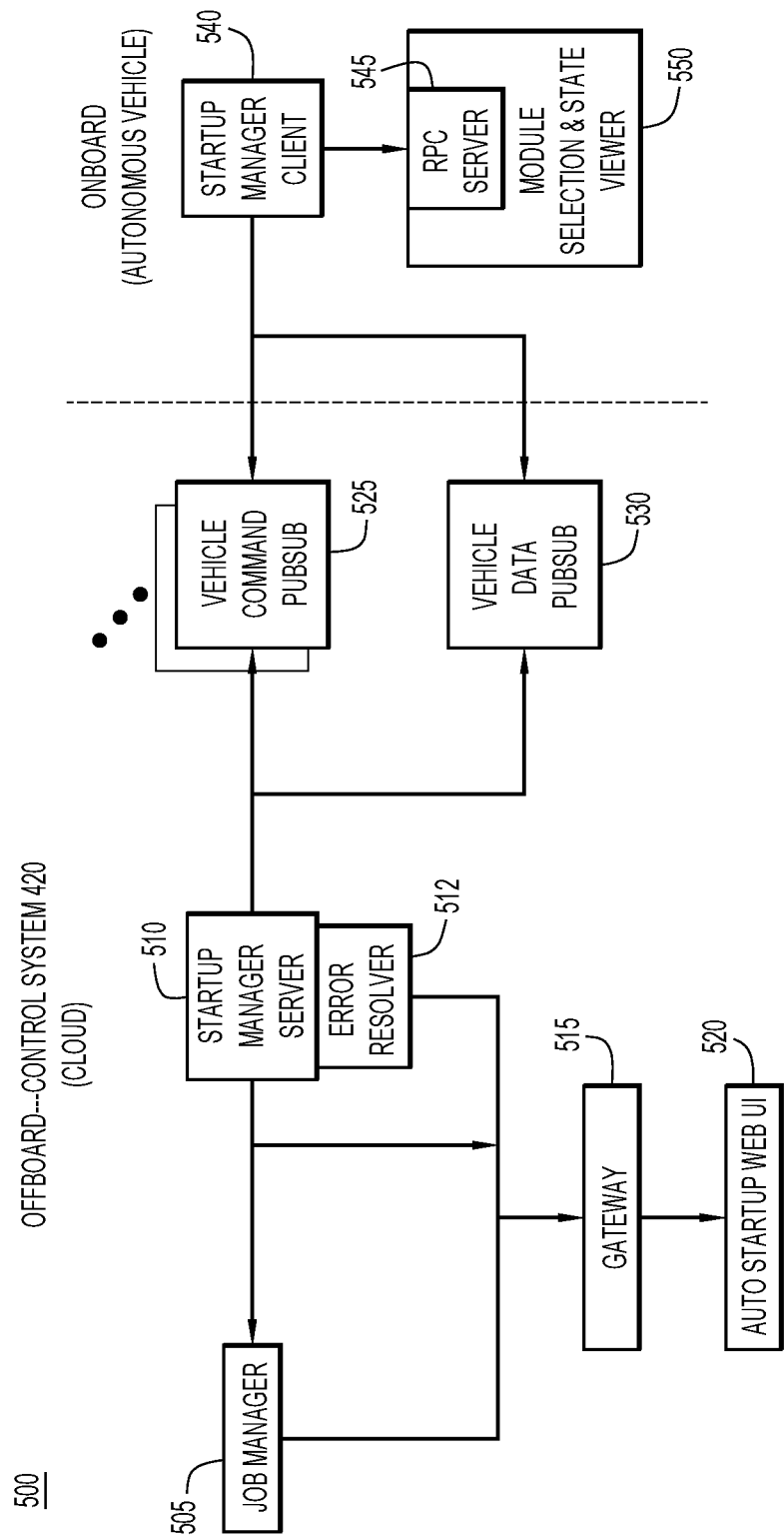
FIG. 6 is a block diagram of startup related functional components in an autonomous vehicle and a control system remote from an autonomous vehicle, according to an example embodiment.

Reference is now made to FIG. 6. FIG. 6 is a functional block diagram 500 of components on the autonomous vehicle and in the control system 420 involved in remotely starting up an autonomous vehicle. Some additional terminology is now provided.

A configuration of a vehicle refers to a combination of module parameters and a calibration profile.

A calibration profile is the output of a calibration process, and is used to determine the offsets and biases of each individual sensor on the vehicle. Calibration profiles also are what determine a sensor type.

A sensor type determines the number and types of sensors deployed on the vehicle, for use in connection with a given job.

As explained above, a module may take the form of a software binary entity. Modules can be turned on or off throughout the duration of the operation of the vehicle. Each module has a set of parameters that may be defined in the form of a tuple.

The control system 420, which may be cloud-based, includes a job manager 505, a startup manager server 510, an error resolver 512, a gateway 515 and an auto startup web user interface (UI) 520 through which a user operator can log onto the control system 420 and initiate startup of one or more vehicles, as well as observe and manage the startup process, as needed, of one or more vehicles.

The control system further may include a vehicle command publication/subscriber (pub/sub) function 525 and a vehicle data pub/sub function 530. There is a unique instance of the vehicle command pub/sub function 525 for each autonomous vehicle with which the control system 420 is in communication. In another form, the control system may issue commands via API calls to one or more remote procedure call (RPC) servers in the vehicles. The vehicle servers may be accessed over a secure virtual private cloud (VPC).

The autonomous vehicle includes a startup manager client 540 and a RPC server 545 that functions as a backend server for a module selection and state viewer function 550. As shown in FIG. 6, the startup manager client 540 sends data to the vehicle command pub/sub function 525, as well as sends commands received from the vehicle command pub/ sub function 525 to the RPC server 545. The RPC server 545 generates controls to individual hardware or software modules on the vehicle.

The job manager 505 assigns vehicles and operators to jobs (or missions). A job contains a set of requirements, such as software requirements, operator requirements, sensor configuration requirements, etc. Dispatchers/user operators may interact via a user interface (UI) provided by the job manager to schedule jobs and assign them to vehicles.

The startup manager server 510 manages the startup and shutdown life cycle of the vehicles, handles communication between onboard functions and offboard functions, and serves status information to the auto startup web UI 520. The startup manager server 510 calls the job manager 505 to obtain job metadata (operators, software, configuration, and module) and sends this to startup manager client. The startup manager client 540 communicates startup status to the startup manager server 510 on a regular interval. The startup manager server 510 can automatically file bugs for any errors that occur during the startup process. The error resolver 512 consumes errors provided by the startup manager client 540 for one or more errors associated with starting up on or more modules on the vehicle, and either provides recommendations, via the auto startup web UI 520 for resolving those errors, or automatically takes actions to resolve the errors by sending appropriate error resolution commands to the startup manager client 540, which in turn, relays those commands to the RPC server 545. The automated error resolution process is described in more detail below.

The startup manager client 540 is the intermediary between the startup manager server 510 and the RPC server 545. It acts as a relay point between startup manager server 510 and the module selection and state viewer 550. There are two flows of information—periodic status updates from the RPC server 545 sent through to the startup manager client 540, and commands from the startup manager server 510 sent to module selection and state viewer 550. The startup manager client 540 serves as a relay function, to validate or if necessary, translate commands from startup manager server 510 for relay to module selection and state viewer 550. The RPC server 545 contains the endpoints for the manipulation of autonomy system state (controlling modules, configurations, etc.) as well as for querying system state (currently activated modules, loaded configurations, software version, etc.). It should be understood that periodic status updates may be sent via a single vehicle data pubsub channel 530 for all vehicles from the startup manager client 540 to the startup manager server 510.

Figure 7:
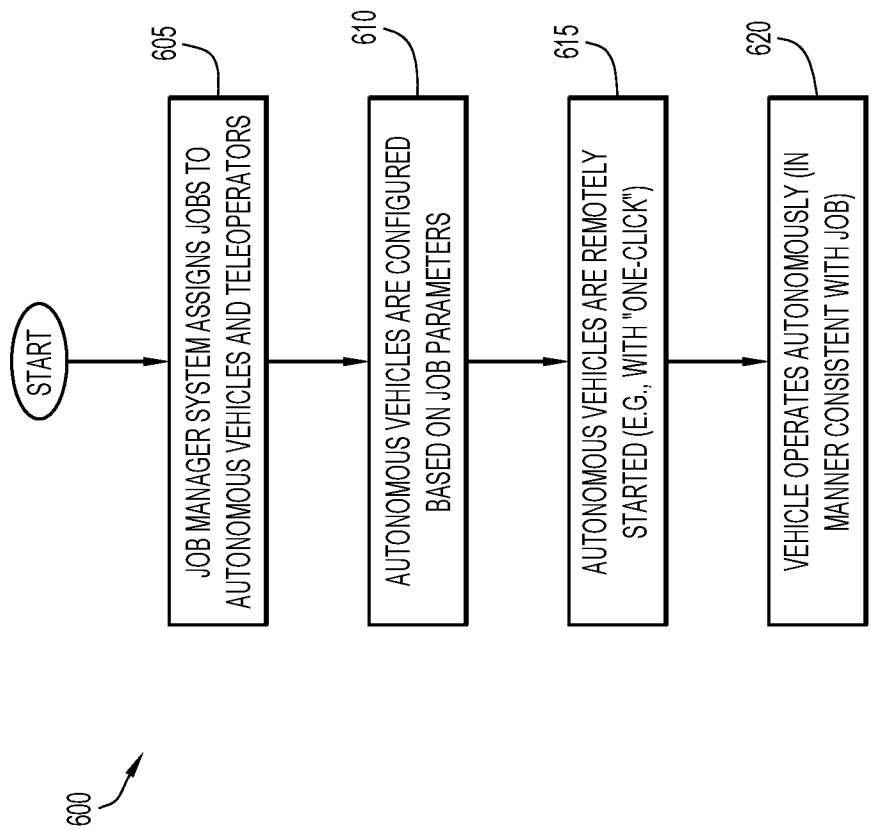
FIG. 7 is a process flow diagram which illustrates a method of preparing autonomous vehicles for use in accordance with an embodiment.

In order for an autonomous vehicle to carry out, or otherwise complete, a job, the vehicle is generally prepared or otherwise configured such that the vehicle may carry out the job. FIG. 7 is a process flow diagram that illustrates a method of preparing autonomous vehicles for use in accordance with an embodiment. A method 600 of preparing an autonomous vehicle for use begins at a step 605 in which a job manager system assigns jobs to various autonomous vehicles and teleoperators. That is, jobs may be allocated to autonomous vehicles in a fleet, and teleoperators may be designated to substantially oversee the operations of particular autonomous vehicles.

In step 610, the autonomous vehicles are configured based on job parameters associated with the jobs that are to be performed by the autonomous vehicles. In one embodiment, compartments of each autonomous vehicle may be configured based on the particulars of the job assigned to each autonomous vehicle. For example, if an autonomous vehicle is to deliver cold items, the autonomous vehicle may be configured to deliver the cold items in part by providing refrigeration capabilities in at least one compartment of the autonomous vehicle. Configuring each autonomous vehicle based on job parameters may also include, but is not limited to including, configuring sensors and/or software.

After the autonomous vehicles are configured based on job parameters, the autonomous vehicles are remotely started in a step 615. Remotely starting the autonomous vehicles may include starting one or more autonomous vehicles at substantially the same time, e.g., using a one-click method. In one embodiment, information obtained from a job manager may be used to ascertain when an autonomous vehicle is ready to be started up. Once the autonomous vehicles are remotely started, the method of preparing autonomous vehicles for use is completed. Thus, at 620, the vehicle operates autonomously in a manner consistent with the one or more jobs with which it is configured.

As explained above, remotely starting an autonomous vehicle is much more challenging than starting a human operated vehicle. This is because an autonomous vehicle has many modules/functions/systems that need to be turned on and initialized. Autonomy software, hardware, and localization can take a relatively long period of time (30 minutes or more, with current systems) in order to startup these functions in proper sequence. The goal is to minimize human interaction to startup autonomous vehicles.

Autonomous vehicles may be started up many times a day and if it takes 30 minutes or more to startup each autonomous vehicle, this adds up to a significant amount of time per day for each autonomous vehicle. Moreover, a significant percentage of vehicle startups may fail and the startup process may have to be repeated. Errors could be caused by lack of dependency knowledge as well as when a human operator would try to localize the vehicle, but the vehicle is not ready for localization. The proper modules need to be successfully started up before trying to localize. The techniques presented herein can reduce this amount of startup time to a few minutes per autonomous vehicle, and with greater reliability.

Another unique aspect about starting up an autonomous vehicle is that the autonomous vehicle needs to have a very precise knowledge about its immediate surroundings, how it is oriented relative to its surroundings, in order to be ready to perform localization. Localization is the process by which the vehicle determines where it is in relation to the rest of the world and in particular in relation to the context map. Determining that the vehicle is ready for localization involves reliance on the dependency graph among various modules that need to be successfully started up before the vehicle is ready to try to localize.

Automatically startup an entire fleet of autonomous vehicles at the same time is even more challenging. When there is a large fleet of autonomous vehicles to be started up, it becomes untenable to have to start-up each vehicle individually. It is envisioned that, in the future, a plurality of designated vehicles (e.g., dozens) in a fleet would startup and go about their tasks (deliveries to customers) at some specified time, with little to no human control interaction. The tools and tasks that a human operator does to start-up a single vehicle need to be automated and done remotely (from a control center, not from a chase car), and these tasks need to be performed at scale. One human operator may remotely start-up and troubleshoot numerous autonomous vehicles.

With current startup techniques, a wired connection is provided to the vehicle and a human operator manually selects each stage/module to be started up, in the proper order, to start up the vehicle. The user would have to know what each module does and how to start up modules in a specific sequence. The dependencies of the modules were not well understood.

The techniques presented herein are based on a more thorough knowledge of the dependencies between the modules and account for that in the orchestration during an automated startup process. Startup is now performed via a wireless, or over-the-air (OTA), connection to the vehicle. This startup process is now much more reliable and faster. A human operator clicks a button on a user interface screen and the remote startup process begins.

Applying this to a fleet of vehicles makes this even more important because each autonomous vehicle could have different types of errors as the modules are started up. Thus, the remote startup process presented herein has automatic troubleshooting for errors that arise during startup of modules. Every error that is encountered is addressed based on an accumulated database of solutions for those errors.

As explained above, it has been determined that with current startup techniques, vehicles currently spend up to several hours per day in the startup process, resulting in a significant detractor of vehicle utilization. This is largely the result of a startup process duration that can last up to 30 minutes, and often needs to be performed numerous times per day. The automatic startup techniques presented herein overcome this problem by simplifying the startup process and automating most manual operator inputs through integration with the job manager 505 (FIG. 6). It is envisioned that when there is a relatively low operator-to-bot ratio, automatic startup may play an important part of a remote command ecosystem useful to efficiently operate the fleet of vehicles.

One aspect of the automatic startup process presented herein involves understanding and leveraging dependencies between various hardware and/or software modules of the vehicle so that time is not wasted trying to complete a startup function that will not occur due to a prerequisite hardware and/or software module not having been successfully started.

Figure 8:
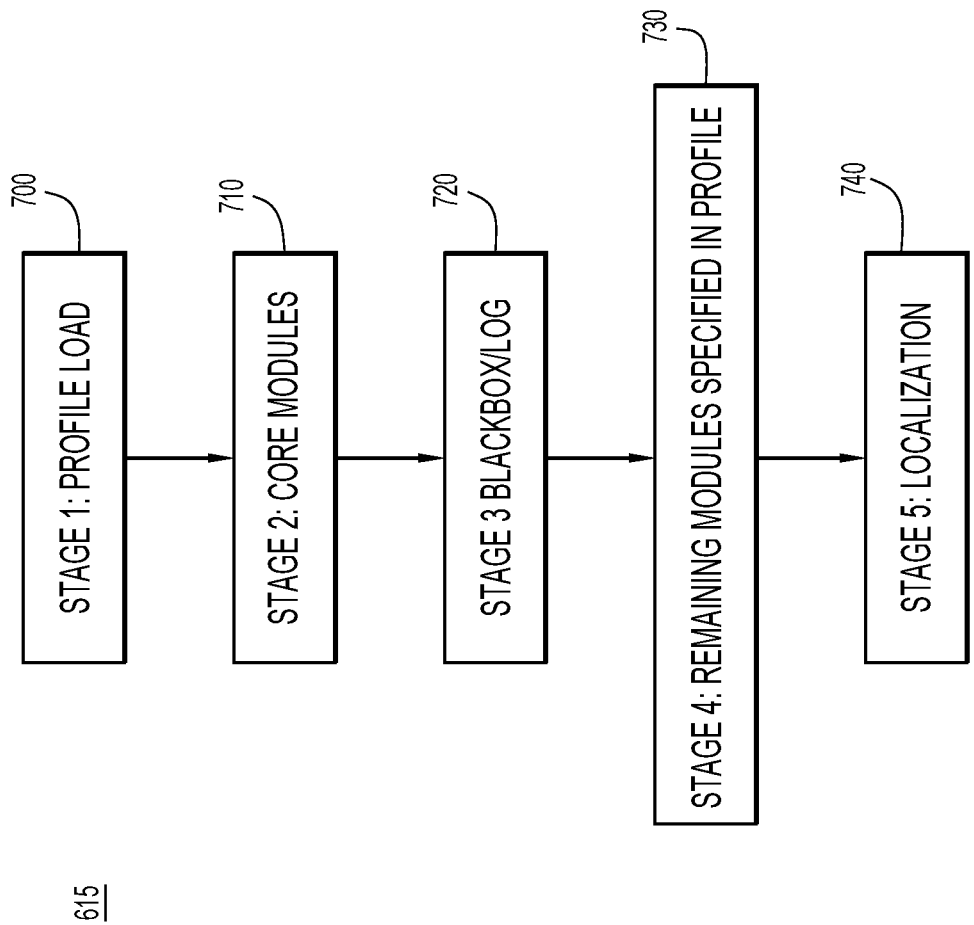
FIG. 8 is a flow diagram illustrating a multiple stages involved in the startup of an autonomous vehicle, according to an example embodiment.

Reference is now made to FIG. 8. The startup process, depicted by operation 615 in FIG. 7, by which designated hardware and/or software modules of the vehicle are started up, may involve multiple stages such that a set of hardware and/or software modules on the vehicle are started in a particular order. FIG. 8 shows that there may be five stages: stage 1 shown at 700, in which profile load occurs, stage 2 shown at 710 in which certain core modules are started up, stage 3 shown at 720 in which the Blackbox or log module is started, stage 4 shown at 730 in which the remaining modules specified in the profile are started and stage 5 shown at 740 in which localization is performed.

The profile load at stage 1, at 700, includes loading to the vehicle system data that identifies a specific set of modules that the vehicle will run and what details are needed for the vehicle to be considered healthy, the different errors that the vehicle needs to keep track of, etc. The profile indicates which hardware and/or software modules should be automatically started on the vehicle. Not all modules are automatically started, as some may be toggled on and off by an operator based on whether that functionality is needed. Different profiles are mapped to different types of missions or jobs but the profile itself does not contain mission information. Information about the job/mission is delivered to the vehicle after orchestration of the onboard software, in stage 4. In addition, stage 1 starts up two modules that enable onboard modules of the vehicle to communicate with each other. The names give to the modules that are part of the profile load stage 700 are IdFinder and Registry, and are shown in example user interface screens described further below.

Turning now to stage 2, this is where core hardware modules are started up on the vehicle, and in a particular or specific order as well. Thus, there is a dependency among the core hardware modules that are started up in stage 2, and a dependency on other modules of the vehicle that are started up subsequent to stage 2. For example, in stage 2, a first hardware module, called a body control module (BcmModule), is first started up. This first hardware module provides for a time reference for the vehicle systems, such as a monotonically increasing time for the modules to use on the vehicle in order to record onboard event timestamps. Next, after the first hardware module, a second hardware module (called a brain stem computer module or Bscmodule) that is dedicated to main computing functions of the vehicle, is started up. This second hardware module provides raw pose data from the vehicle hardware. Next, after the second hardware module, a third hardware module is started up that processes that raw pose data from the second hardware module and makes this processed pose data available to other modules in the system.

In stage 3, the system log function, called Blackbox, is started, in order to record events observed by the vehicle once it is started up for operation.

Stage 4 involves starting up the remaining modules (indicated in the profile) for the vehicle. These modules can, in some cases, be started in an arbitrary order. In addition, information about the job for the vehicle is downloaded to the vehicle as part of stage 4.

Stage 5 involves localization of the vehicle. A remote command is presented to a user operator at the control system to indicate when all the modules necessary for localization are up and running in a healthy manner.

Knowing when the vehicle is ready for localization is complex, and previously an operator would not know whether the vehicle was ready for localization. However, since the modules, in particular the core modules in stage 2 as well as certain modules in stage 4, are started according to a dependency graph, an operator can much more readily be informed that the vehicle is ready for localization, and at such time, complete localization in a brief period of time, such as 30 seconds. In order to perform localization, hardware validation is needed for cameras, sensors and other related hardware used for localization, and this is achieved in stage 2.

As described above, localization determines highly accurate 3-dimensional vehicle location and orientation relative to the context map (e.g., height of stop signs, width of lanes on roads, etc.). During localization, the vehicle is moved a short distance to detect an extremely precise GPS signal (accuracy within inches), and then learns exactly where the vehicle is located and its orientation on the context map. Achieving localization (precise location and orientation relative to context map) is a prerequisite to the vehicle operating autonomously. After localization is complete, the route for the job may be loaded to the vehicle, and there may be no further dependencies for starting up the other modules on the vehicle. In one form, the localization procedure may be initiated, under control from a user operator at a remote control system, once the user operator is notified that all preconditions for localization have been met during startup.

In another variation, the localization procedure may be invoked automatically at the vehicle upon the vehicle determining the preconditions (prerequisite hardware and/or software modules) haven successfully started up.

Reference is still made to FIGS. 6-8. During stage 4, when the rest of the modules are started up, there may be many errors that could occur. Each module could generate multiple errors. Currently, an operator would have to manually determine the appropriate resolution based on error notifications received from the startup manager client 540 on the vehicle. In accordance with one aspect, the error resolver 512 includes knowledge about how to resolve errors experienced when starting up modules on the vehicle.

For example, the error resolver 512 may determine an appropriate error resolution from application of error resolutions (manually by operators or automatically) accumulated overtime in a database and statistical knowledge built up over time. The error resolver 512 may also use machine learning to determine an error resolution with the highest likelihood of success for a given error. In one form, the error resolver 512 may generate human readable error messages with instructions, presented via the auto startup web UI 520, of how to resolve errors, or may automatically generate the appropriate one or more error resolution commands that are transmitted to the vehicle to resolve the errors. Automatic or assisted error resolution is particularly valuable when starting up a fleet of vehicles.

Thus, the error resolution intelligence may reside offboard from the vehicle. The error resolver 512 receives error notifications from the onboard system and based on attributes of the vehicle (software version, configuration, historical patterns, vehicle type, etc.), the error resolver 512 generates resolutions for those errors. The error resolutions may be presented as recommendations to the user operator, who can then initiate those resolutions via the auto startup web UI 520, or commands for the error resolutions are automatically transmitted to the onboard system to be invoked. It should be understood that it is also envisioned that the onboard system may, entirely on its own, detect errors and resolve them automatically using the error resolve capabilities that are deployed onboard the vehicle.

Figure 9:
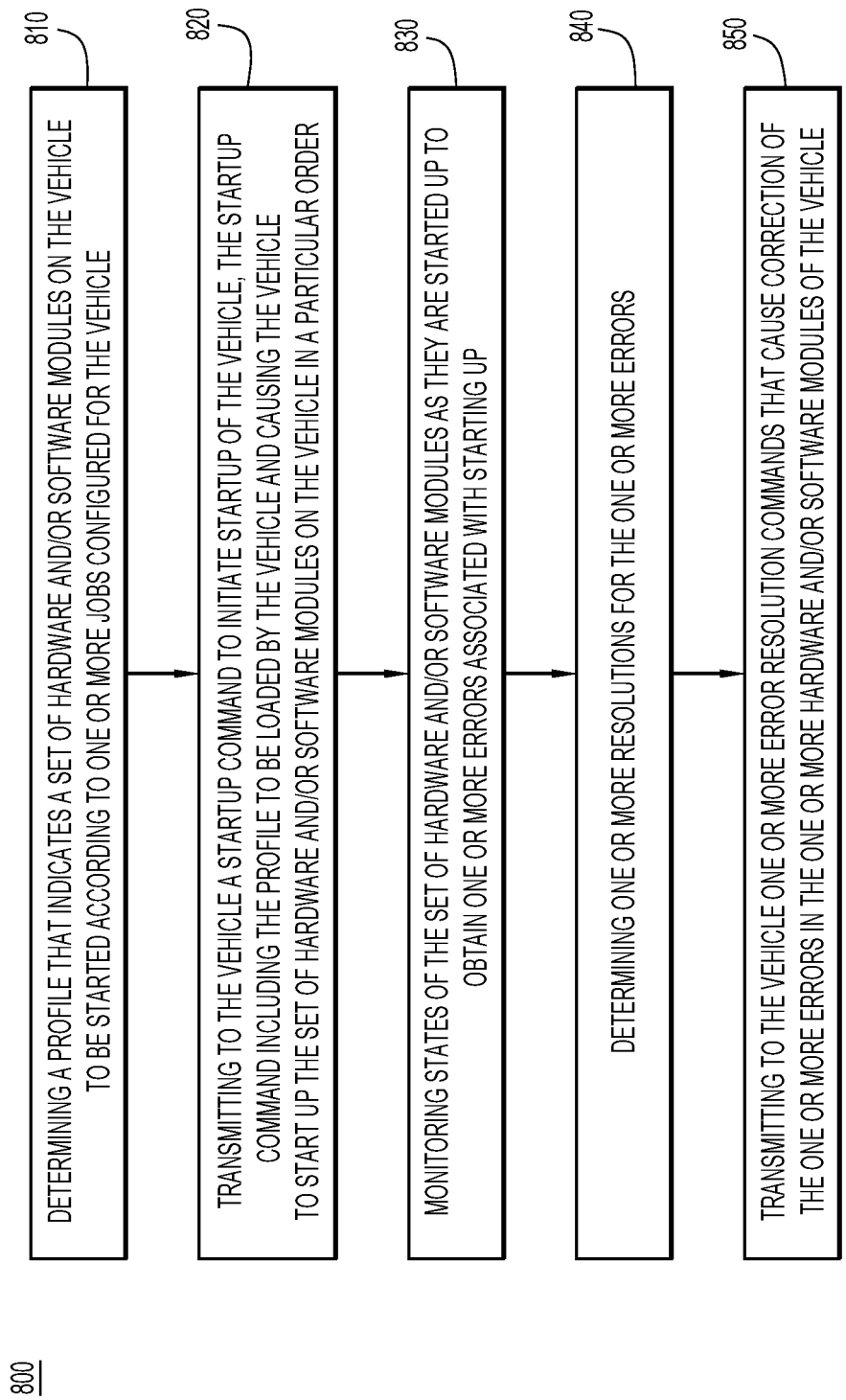
FIG. 9 is a flow chart depicting a vehicle startup process according to an example embodiment.

Turning now to FIG. 9, a flow chart is shown for a vehicle startup process 800 that includes error resolution according to an example embodiment.

At 810, the process 800 includes determining a profile that indicates a set of hardware and/or software modules on the vehicle to be started according to the one or more jobs configured for the vehicle. As described above, the profile is dependent on the one or more jobs configured for the vehicle.

At 820, the process includes transmitting to the vehicle a startup command to initiate startup of the vehicle. The startup command includes the profile to be loaded by the vehicle and causes the vehicle to startup the set of hardware and/or software modules on the vehicle in a particular order. The particular order for starting up the set of hardware and/or software modules is based on functional dependencies among the hardware and/or software modules. At 830, the process includes monitoring states of the set of hardware and/or software modules as they are started up. The monitoring operation may include obtaining, from the vehicle, status reports indicating one or more errors associated with starting up one or more of the hardware and/or software modules.

At 840, the process includes determining one or more resolutions for the one or more errors. At 850, the process includes transmitting to the vehicle one or more error resolution commands that cause correction of the one or more errors in the one or more hardware and/or software modules of the vehicle.

The determining a profile operation 810, transmitting the startup command operation 820, monitoring states operation 830, the determining operation 840 and the transmitting the one or more error resolution commands operation 850 are performed at a control system remote from the vehicle.

As described above, the process 800 may further include: displaying to a user operator at the control system, information associated with the one or more resolutions for the one or more errors, and wherein the transmitting the one or more error resolution commands operation 850 is responsive to input from the user operator at the control system.

Alternatively, or in addition, the transmitting the one or more error resolution commands may be performed automatically to cause resolution of the one or more errors in the one or more hardware and/or software modules of the vehicle.

Figure 10:
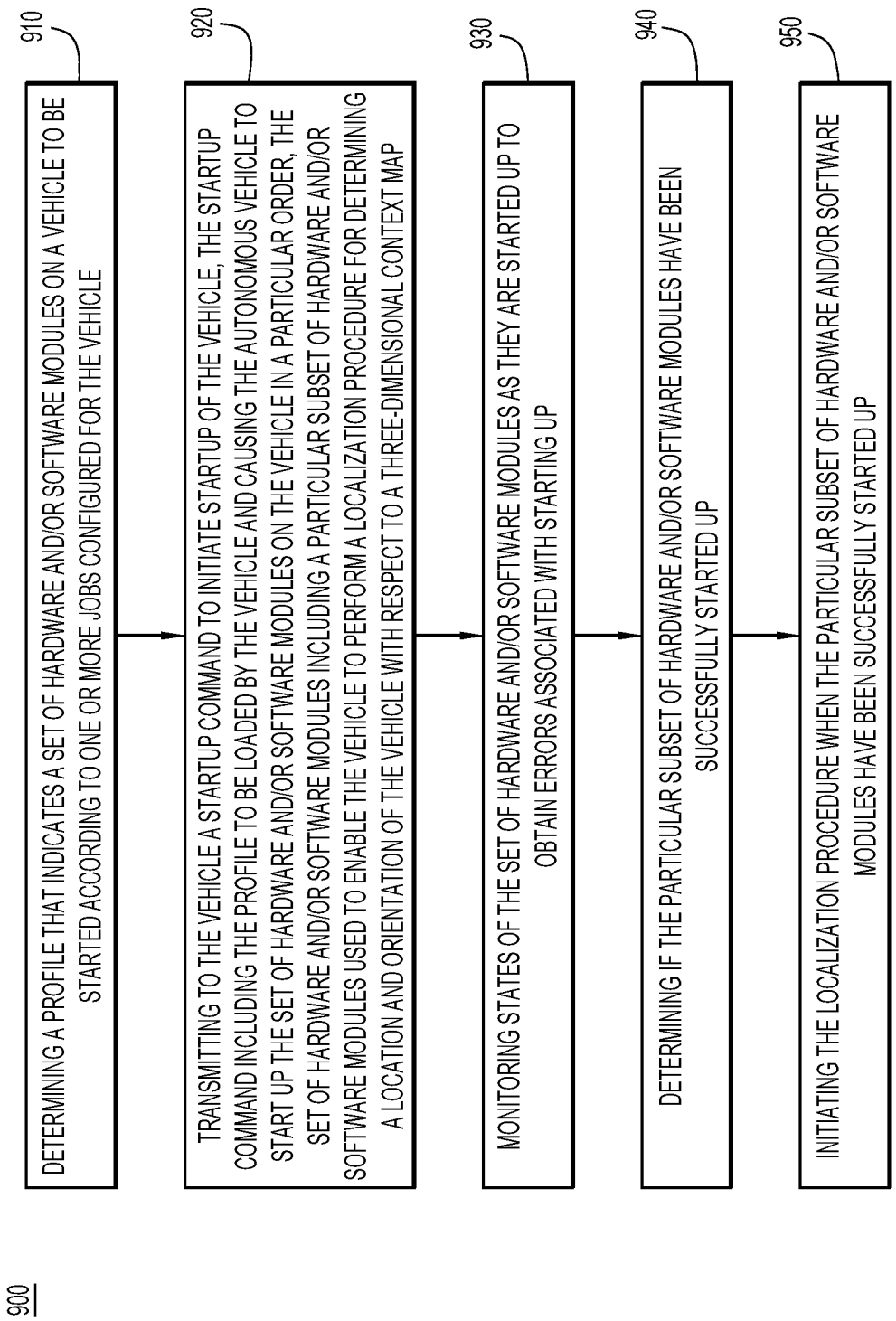
FIG. 10 is a flow chart depicting a vehicle startup process according to another example embodiment.

According to another aspect, the remote startup techniques presented herein include determining when a successful startup has been achieved for a subset of hardware and/or software modules used to enable the vehicle to perform a localization procedure for determining a location of the vehicle with respect to a three-dimensional context map. To this end, reference is now made to FIG. 10. FIG. 10 depicts a flow chart for a remote startup process 900 performed at a control system remote from at least one vehicle to be started up, according to an example embodiment. The process 900 includes, at 910, determining a profile that indicates a set of hardware and/or software modules on the vehicle to be started according to the one or more jobs configured for the vehicle. At 920, the process 900 includes transmitting to the vehicle a startup command to initiate startup of the vehicle. The startup command includes the profile to be loaded by the vehicle and which causes the vehicle to start up the set of hardware and/or software modules on the vehicle in a particular order. The set of hardware and/or software modules including a particular subset of hardware and/or software modules used to enable the vehicle to perform a localization procedure for determining a location and orientation of the vehicle with respect to a three-dimensional context map.

At 930, the process 900 includes monitoring states of the set of hardware and/or software modules as they are started up.

At 940, the process 900 includes determining if the particular subset of hardware and/or software modules have been successfully started up.

Finally, at 950, the process 900 includes initiating the localization procedure when the particular subset of hardware and/or software modules have been successfully started up, in order to determine the location of the vehicle with respect to a three-dimensional context map.

As explained above, the operations of determining the profile, transmitting the startup command, and monitoring states, may be performed at a control system remote from the vehicle. Moreover, the monitoring may be performed based on status reports related to the set of hardware and/or software modules obtained at the control system from the vehicle.

The operation of initiating the localization procedure may include transmitting from the control system one or more localization controls to perform the localization procedure at the vehicle. In another variation, as described above, initiating the localization procedure may be performed automatically at the vehicle upon the vehicle determining that the particular subset of hardware and/or software modules have successfully started up.

The status reports may indicate one or more errors associated with starting up one or more of the hardware and/or software modules. The process 900 may further include, determining, at control system, one or more resolutions for the one or more errors. Further still the process 900 may include displaying to a user operator at the control system, information associated with the one or errors and information associated with the one or more resolutions for the one or more errors; and in response to input from the user operator at the control system, transmitting from the control system to the vehicle one or more error resolution commands that cause resolution of the one or more errors in the one or more hardware and/or software modules of the vehicle. In another variation, the process 900 may involve automatically transmitting from the control system to the vehicle one or more error resolution commands from the control system that cause resolution of the one or more errors in the one or more hardware and/or software modules of the vehicle.

The operation of determining the one or more resolutions may be performed based on data accumulated over time associated with starting up the set of hardware and/or software modules of vehicles.

Reference is now made to FIGS. 11-14. These figures illustrate examples of UI screens presented to a human user operator to interact with one or more vehicles for purposes of the vehicle startup operations described herein.

Figure 11:
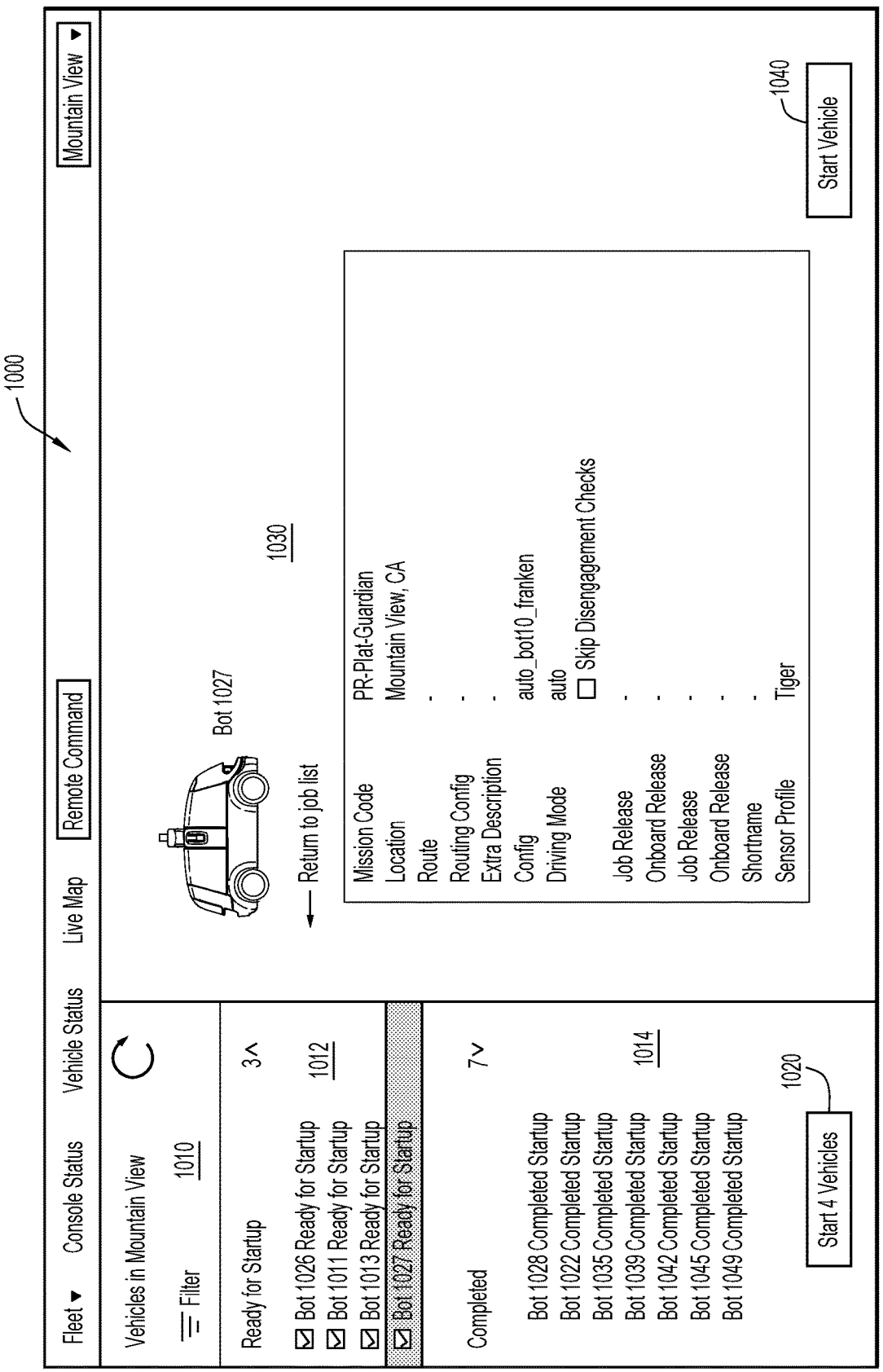

FIG. 11 illustrates an example of a startup UI screen from which a user operator may select one or a plurality of vehicles to initiate startup. In this example, the startup UI screen 1000 includes a vehicle list panel 1010 in which one or a plurality of vehicles may be listed by vehicle name. A first section 1012 of the vehicle list panel 1010 contains a list of vehicles ready for startup, such as Bot 1026, Bot 1011, Bot 1013 and Bot 1027, and so on. A second section 1014 of the vehicle list panel 1010 contains a list of vehicles for which startup has been completed, such as Bot 1028, Bot 1022, Bot 1035, Bot 1039, Bot 1042 and Bot 1049.

In the first section 1012 in which vehicles ready for startup are listed, a check box is provided beside each vehicle name to allow a user operator to select a vehicle to initiate startup. The startup command UI button is shown at 1020. Thus, a user operator can select one or multiple vehicles to initiate startup, with a single click of the startup UI button 1020.

The middle section 1030 of the startup UI screen 1000 includes information about a particular vehicle that is selected in the first section 1012 of the vehicle list panel, e.g., Bot 1027. This information may include a mission or job code, location of the vehicle, route of the vehicle, route configuration, configuration name for the vehicle, driving mode, as well as other parameters shown in the figure. There is also a separate startup command UI button 1040 that can be used to start a single vehicle.

Thus, FIG. 11 depicts an example of a UI screen by which a user operator can remotely and automatically initiate a startup process with the click of one button for one or multiple vehicles.

Figure 12:
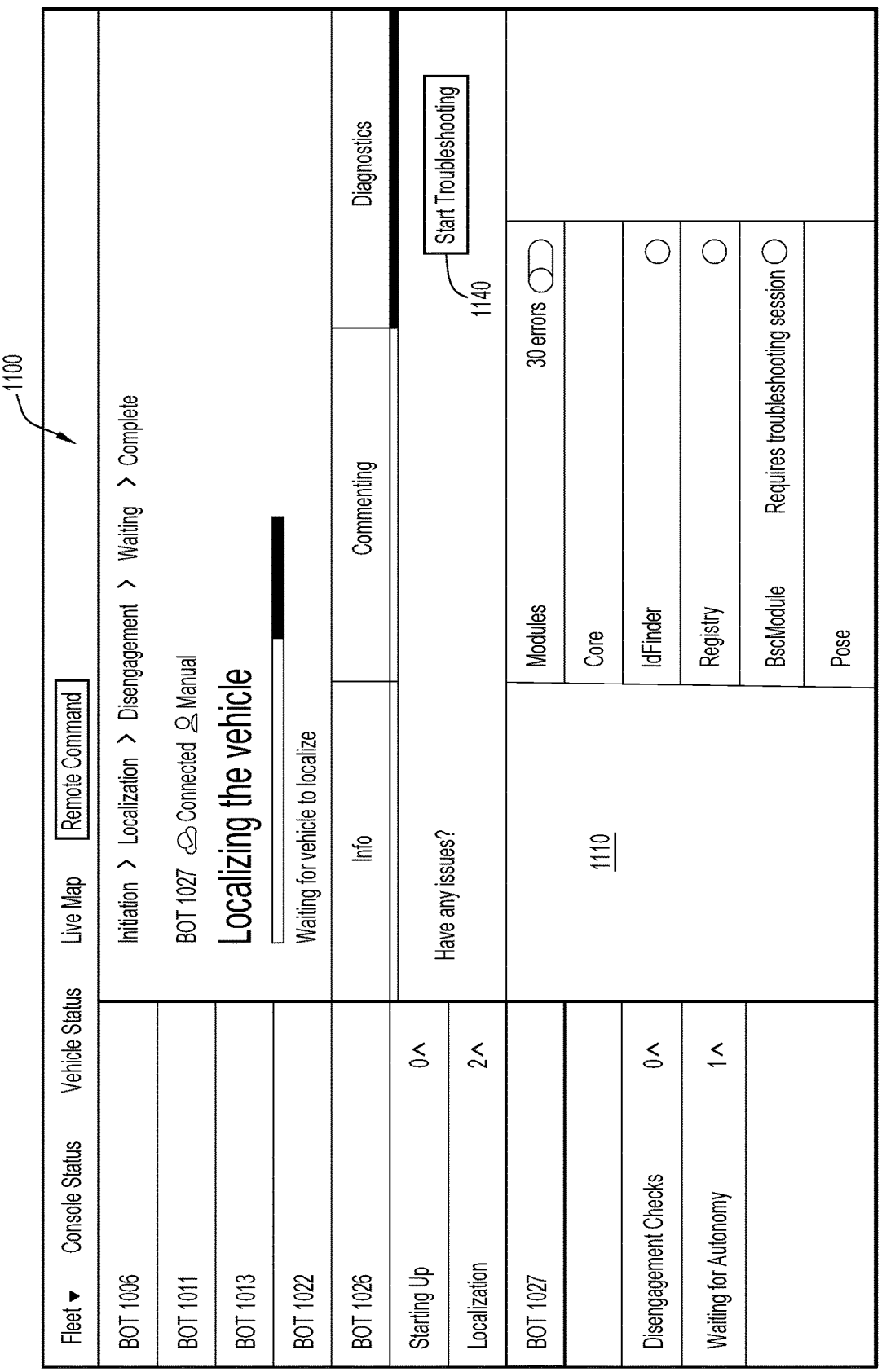

Turning now to FIG. 12, an example UI screen 1100 is shown by which the status of various modules are presented to a user operator for a vehicle, for example, Bot 1027, that is undergoing startup. The UI screen 1100 includes a status display section 1110 in which any issues associated with one or more modules, detected during startup, are displayed to a user operator. In the example shown in FIG. 12, the modules IdFinder and Registry have started up with no issues, whereas the Bscmodule is in need of a troubleshooting session as one or more errors have been detected. A UI button 1140 is provided to initiate automatic troubleshooting for the one or more errors detected with the Bscmodule.

FIG. 13 illustrates an UI screen 1200 that illustrates automatic troubleshooting of one or errors detected for one or more hardware and/or software modules during startup. The UI screen 1200 is presented when a user clicks on the UI button 1140 shown in FIG. 12, for example. There is a section 1210 in the UI screen 1200 in which the status of troubleshooting is displayed. In this example, an issue with the CameraModule and an issue with the FisheyeModule are displayed.

Figure 14:
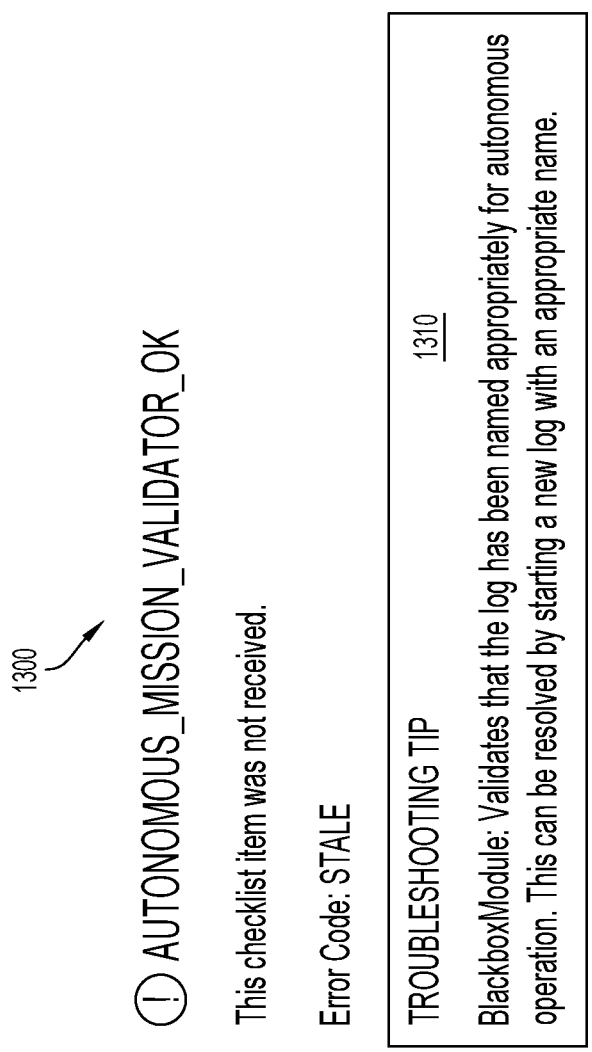

FIG. 14 illustrates an example of a troubleshooting tip message 1300 presented to a user operator for a particular detected error. In this example, the troubleshooting tip message 1300 is for the checklist item not received, called "Autonomous Mission Validator Ok". The content 1310 of the troubleshooting tip message 1300 indicates that there is a problem with the Blackbox module and the resolution is to start a new log with an appropriate name. A user operator can, upon receiving the troubleshooting tip message 1300, manually send the appropriate error resolution command to the vehicle, which in this example, is to start a new log with an appropriate name. As explained above, another variation involves the control system automatically sending the appropriate one or more resolution commands to the vehicle to make the correction in the appropriate hardware or software module of the vehicle to resolve this error.

The ability to troubleshoot errors in this manner is very valuable, particularly when starting up a fleet of vehicles, where numerous errors could potentially be encountered during startup across the fleet of vehicles.

Figure 15:
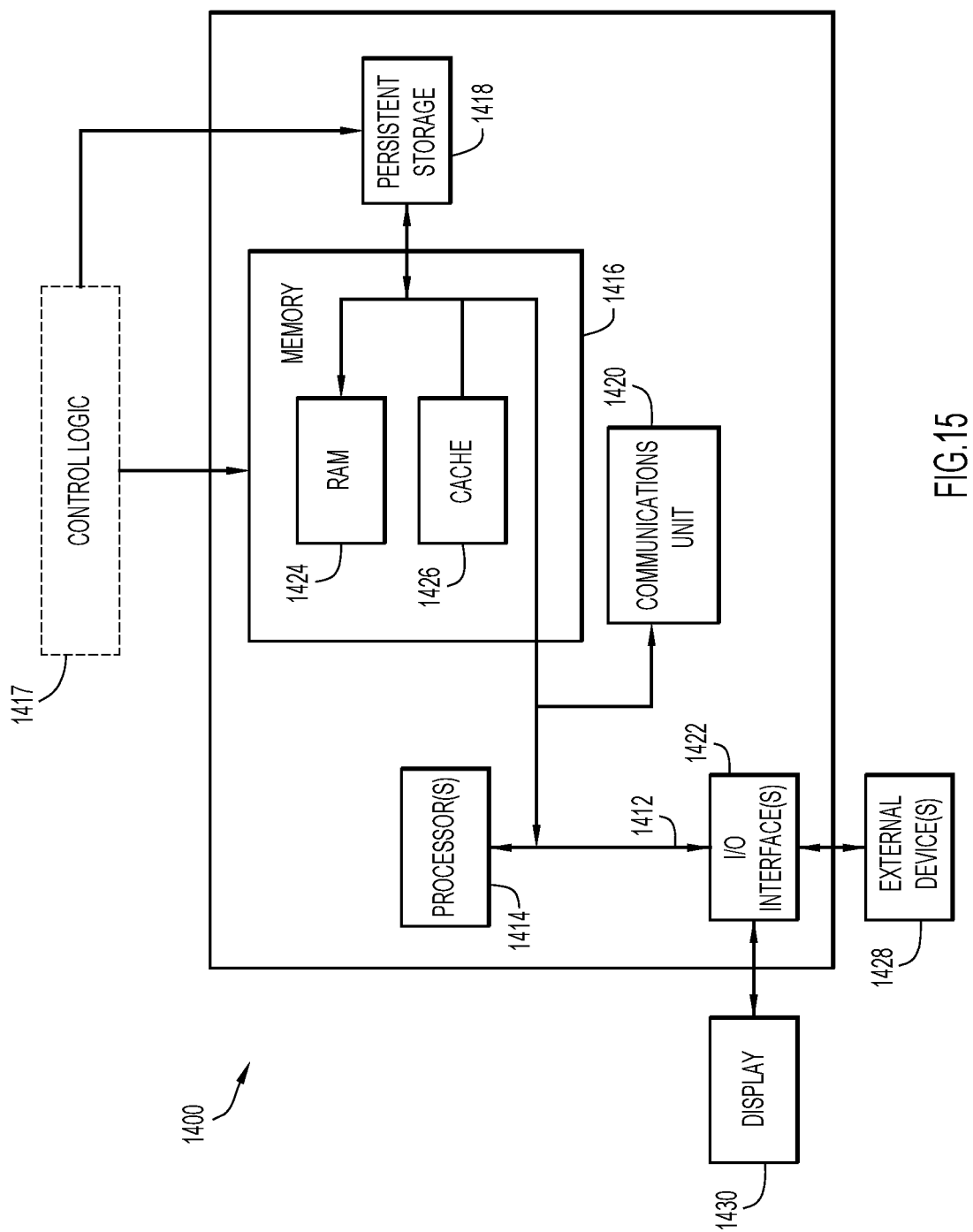
FIG. 15 is a hardware block diagram of a computing device that be configured to perform the computing operations of the control system and of a vehicle, in accordance with an example embodiment.

FIG. 15 illustrates a hardware block diagram of a computing device 1400 that may perform the functions of the aforementioned control system or other computing or control entities referred to herein. It should be appreciated that FIG. 15 provides only an illustration of one embodiment and does not imply any limitations with regard to the environments in which different embodiments may be implemented. Many modifications to the depicted environment may be made.

As depicted, the device 1400 includes a bus 1412, which provides communications between computer processor(s) 1414, memory 1416, persistent storage 1418, communications unit 1420, and input/output (I/O) interface(s) 1422. Bus 1412 can be implemented with any architecture designed for passing data and/or control information between processors (such as microprocessors, communications and network processors, etc.), system memory, peripheral devices, and any other hardware components within a system. For example, bus 1412 can be implemented with one or more buses.

Memory 1416 and persistent storage 1418 are computer readable storage media. In the depicted embodiment, memory 1416 includes random access memory (RAM) 1424 and cache memory 1426. In general, memory 1416 can include any suitable volatile or non-volatile computer readable storage media. Instructions for control logic 1417 may be stored in memory 1416 or persistent storage 1418 for execution by processor(s) 1414. The control logic 1417 may include instructions that, when executed, cause the processor(s) 1414 to perform the various operations performed by the control system (and by the vehicle) described herein.

One or more programs may be stored in persistent storage 1418 for execution by one or more of the respective computer processors 1414 via one or more memories of memory 1416. The persistent storage 1418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1418 may also be removable. For example, a removable hard drive may be used for persistent storage 1418. Other examples include optical and magnetic disks, thumb drives, and smart cards that are inserted into a drive for transfer onto another computer readable storage medium that is also part of persistent storage 1418.

Communications unit 1420, in these examples, provides for communications with other data processing systems or devices. In these examples, communications unit 1420 includes one or more network interface cards. Communications unit 1420 may provide communications through the use of either or both physical and wireless communications links.

I/O interface(s) 1422 allows for input and output of data with other devices that may be connected to computer device 1400. For example, I/O interface 1422 may provide a connection to external devices 1428 such as a keyboard, keypad, a touch screen, and/or some other suitable input device. External devices 1428 can also include portable computer readable storage media such as database systems, thumb drives, portable optical or magnetic disks, and memory cards.

Software and data used to practice embodiments can be stored on such portable computer readable storage media and can be loaded onto persistent storage 1418 via I/O interface(s) 1422. I/O interface(s) 1422 may also connect to a display 1430. Display 1430 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided for remotely starting up a vehicle, comprising: determining a profile that indicates a set of hardware and/or software modules on the vehicle to be started according to one or more jobs configured for the vehicle; transmitting to the vehicle a startup command to initiate startup of the vehicle, the startup command including the profile to be loaded by the vehicle and causing the vehicle to start up the set of hardware and/or software modules on the vehicle in a particular order, the set of hardware and/or software modules including a particular subset of hardware and/or software modules used to enable the vehicle to perform a localization procedure for determining a location and orientation of the vehicle with respect to a three-dimensional context map; monitoring states of the set of hardware and/or software modules as they are started up; and determining if the particular subset of hardware and/or software modules have been successfully started up; and initiating the localization procedure when the particular subset of hardware and/or software modules have been successfully started up, in order to determine the location of the vehicle with respect to a three-dimensional context map.

The particular order for starting up the set of hardware and/or software modules may be based on functional dependencies among the hardware and/or software modules.

The operation of initiating the localization procedure may be performed automatically at the vehicle upon the vehicle determining that the particular subset of hardware and/or software modules have successfully started up.

The operations for determining a profile, transmitting, and monitoring are performed at a control system remote from the vehicle, and the monitoring is performed based on status reports related to the set of hardware and/or software modules obtained at the control system from the vehicle. The initiating operation may involve initiating the localization procedure comprises transmitting from the control system, one or more localization controls to perform the localization procedure at the vehicle.

The status reports may indicate one or more errors associated with starting up one or more of the hardware and/or software modules, and the method may further include, at the control system: determining one or more resolutions for the one or more errors. Moreover, the method may further include: displaying to a user operator at the control system, information associated with the one or errors and information associated with the one or more resolutions for the one or more errors; and in response to input from the user operator at the control system, transmitting from the control system to the vehicle, one or more error resolution commands that cause resolution of the one or more errors in the one or more hardware and/or software modules of the vehicle. In addition, the method may further include automatically transmitting from the control system to the vehicle, one or more error resolution commands from the control system that cause resolution of the one or more errors in the one or more hardware and/or software modules of the vehicle.

Determining the one or more resolutions may be performed based on data accumulated over time associated with starting up the set of hardware and/or software modules of vehicles.

In one form, the vehicle is an autonomous vehicle, and the method further includes: upon determining successful completion of the localization procedure, initiating startup of remaining one or more hardware and/or software modules among the set of hardware and/or software modules; and initiating autonomous operation of the vehicle upon successful startup of the set of hardware and/or software modules.

The operations of determining a profile, transmitting the startup command, monitoring the states, determining if the particular subset of hardware and/or software modules have successfully started up, and initiating the localization procedure may be performed substantially simultaneously for each of a plurality of vehicles. Moreover, the plurality of vehicles may be a plurality of autonomous vehicles, and the method further includes: displaying at control system remote from the plurality of autonomous vehicles, on a graphical user interface a list that includes the plurality of autonomous vehicles; and receiving user operator selection from the graphical user interface of the plurality of autonomous vehicles in the list; wherein determining a profile, transmitting the startup command, monitoring the states, determining if the particular subset of hardware and/or software modules have successfully started up, and initiating the localization procedure are performed substantially simultaneously the plurality of autonomous vehicles.

In another form, a method is provided for remotely starting up a vehicle, comprising: determining a profile that indicates a set of hardware and/or software modules on the vehicle to be started according to one or more jobs configured for the vehicle; transmitting to the vehicle a startup command to initiate startup of the vehicle, the startup command including the profile to be loaded by the vehicle and causing the vehicle to start up the set of hardware and/or software modules on the vehicle in a particular order, wherein the particular order for starting up the set of hardware and/or software modules is based on functional dependencies among the hardware and/or software modules; monitoring states of the set of hardware and/or software modules as they are started up, wherein monitoring includes obtaining status reports indicating one or more errors associated with starting up one or more of the hardware and/or software modules; determining one or more resolutions for the one or more errors; and transmitting to the vehicle, one or more error resolution commands that cause correction of the one or more errors in the one or more hardware and/or software modules of the vehicle.

The operations of determining a profile, transmitting the startup command, monitoring the states, determining the one or more resolutions, and transmitting the one or more error resolution commands may be performed at a control system remote from the vehicle.

The method may further include: displaying to a user operator at the control system, information associated with the one or more resolutions for the one or more errors; and wherein transmitting the one or more error resolution commands is responsive to input from the user operator at the control system. The operation of transmitting the one or more error resolution commands may be performed automatically to cause resolution of the one or more errors in the one or more hardware and/or software modules of the vehicle.

Again, the vehicle may be an autonomous vehicle.

In still another form, a system is provided including: a plurality of vehicles; and a control system remote from, and in communication with, the plurality of vehicles, the control system configured to: determine a profile that indicates a set of hardware and/or software modules on each vehicle of the plurality of vehicles to be started according to one or more jobs configured for each vehicle; send, in response to user input, to each vehicle of the plurality of vehicles, a startup command to initiate startup of each vehicle of the plurality of vehicles, the startup command including the profile to be loaded by a respective vehicle of the plurality of vehicles and causing each respective vehicle to start up the set of hardware and/or software modules, according to the profile for the respective vehicle, on each respective vehicle in a particular order, wherein the particular order for starting up the set of hardware and/or software modules is based on functional dependencies among the hardware and/or software modules; monitor states of the set of hardware and/or software modules as they are started up, including obtaining status reports indicating one or more errors associated with starting up one or more of the hardware and/or software modules in one or more vehicles of the plurality of vehicles; determine one or more resolutions for the one or more errors; and send to the one or more vehicles that reported one or more errors, one or more error resolution commands that cause correction of the one or more errors in the one or more hardware and/or software modules of the one or more vehicles.

The control system may be further configured to: present, in a user interface to a user operator, a listing of vehicles to be started up, wherein the listing includes the plurality of vehicles; obtain user input from the user operator, via the user interface, of a selection of the plurality of vehicles to be started up; and receive a single user input command to initiate, substantially simultaneously, startup of the plurality of vehicles.

Still further, the control system may be configured to: display to a user operator, information associated with the one or more resolutions for the one or more errors; and send to the one or more vehicles, the one or more error resolution commands, in response to input from the user operator.

The control system may be configured to automatically send to the one or more vehicles, the one or more error resolution commands.

The control system may be configured to determine the one or more resolutions is performed based on data accumulated over time associated with starting up the set of hardware and/or software modules of vehicles.

In still another form, one or more non-transitory computer readable storage media are provided that, when encoded with instructions, that when executed by a processor (or multiple processors), cause the processor to perform operations including: determining a profile that indicates a set of hardware and/or software modules on the vehicle to be started according to one or more jobs configured for the vehicle; transmitting to the vehicle a startup command to initiate startup of the vehicle, the startup command including the profile to be loaded by the vehicle and causing the vehicle to start up the set of hardware and/or software modules on the vehicle in a particular order, wherein the particular order for starting up the set of hardware and/or software modules is based on functional dependencies among the hardware and/or software modules; monitoring states of the set of hardware and/or software modules as they are started up, wherein monitoring includes obtaining status reports indicating one or more errors associated with starting up one or more of the hardware and/or software modules; determining one or more resolutions for the one or more errors; and transmitting to the vehicle, one or more error resolution commands that cause correction of the one or more errors in the one or more hardware and/or software modules of the vehicle.

In still another form, one or more non-transitory computer readable storage media are provided that, when encoded with instructions, that when executed by a processor (or multiple processors), cause the processor to perform operations including: determining a profile that indicates a set of hardware and/or software modules on the vehicle to be started according to one or more jobs configured for the vehicle; transmitting to the vehicle a startup command to initiate startup of the vehicle, the startup command including the profile to be loaded by the vehicle and causing the vehicle to start up the set of hardware and/or software modules on the vehicle in a particular order, the set of hardware and/or software modules including a particular subset of hardware and/or software modules used to enable the vehicle to perform a localization procedure for determining a location and orientation of the vehicle with respect to a three-dimensional context map; monitoring states of the set of hardware and/or software modules as they are started up; determining if the particular subset of hardware and/or software modules have been successfully started up; and initiating the localization procedure when the particular subset of hardware and/or software modules have been successfully started up, in order to determine the location of the vehicle with respect to a three-dimensional context map.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for remotely starting up a vehicle, comprising:
at a control system remote from the vehicle:
determining a profile that indicates a set of hardware and/or software modules on the vehicle to be started according to one or more jobs configured for the vehicle, and the vehicle having a configuration that includes a calibration profile used to determine a number and types of one or more sensors deployed on the vehicle for use in connection with a given job of the one or more jobs;
transmitting to the vehicle a startup command to initiate startup of the vehicle, the startup command including the profile to be loaded by the vehicle and causing the vehicle to start up the set of hardware and/or software modules on the vehicle in a particular order, the set of hardware and/or software modules including a particular subset of hardware and/or software modules used to enable the vehicle to perform a localization procedure for determining a location and orientation of the vehicle with respect to a three-dimensional context map;
obtaining from the vehicle, status reports related to the set of hardware and/or software modules of the vehicle, wherein the status reports indicate one or more errors associated with starting up one or more of the hardware and/or software modules;
based on the status reports, monitoring states of the set of hardware and/or software modules as they are started up;
determining one or more resolutions for the one or more errors based on data accumulated over time associated with starting up the set of hardware and/or software modules of vehicles, wherein determining the one or more resolutions for the one or more errors is based on attributes of the vehicle including: software version running on the vehicle, the configuration of the vehicle, historical patterns, and vehicle type; and
initiating the localization procedure when the particular subset of hardware and/or software modules have been successfully started up, in order to determine the location of the vehicle with respect to a three-dimensional context map;
wherein the vehicle is one of a plurality of vehicles under control of the control system, and the control system further:
providing a vehicle command publish/subscribe (pub/sub) function and a vehicle data pub/sub function for each of the plurality of vehicles; and
receiving periodic status updates fro a given vehicle of the plurality of vehicles via a corresponding vehicle data pub/sub function for the given vehicle.

2. The method of claim 1, wherein the particular order for starting up the set of hardware and/or software modules is based on functional dependencies among the hardware and/or software modules.

3. The method of claim 1, wherein initiating the localization procedure comprises transmitting from the control system, one or more localization controls to perform the localization procedure at the vehicle.

4. The method of claim 1, wherein the calibration profile further includes output of a calibration process used to determine offsets and/or biases of each of the one or more sensors on the vehicle.

5. The method of claim 1, further comprising:
displaying to a user operator at the control system, information associated with the one or errors and information associated with the one or more resolutions for the one or more errors; and
in response to input from the user operator at the control system, transmitting from the control system to the vehicle, one or more error resolution commands that cause resolution of the one or more errors in the one or more hardware and/or software modules of the vehicle.

6. The method of claim 1, further comprising:
automatically transmitting from the control system to the vehicle, one or more error resolution commands from the control system that cause resolution of the one or more errors in the one or more hardware and/or software modules of the vehicle.

7. The method of claim 1, wherein determining the one or more resolutions is performed based further on statistical knowledge built up over time, or using machine learning techniques, to determine an error resolution with a highest likelihood of success for a given error.

8. The method of claim 1, wherein initiating the localization procedure is performed automatically at the vehicle upon the vehicle determining that the particular subset of hardware and/or software modules have successfully started up.

9. The method of claim 1, wherein the vehicle is an autonomous vehicle, and further comprising:
upon determining successful completion of the localization procedure, initiating startup of remaining one or more hardware and/or software modules among the set of hardware and/or software modules; and
initiating autonomous operation of the vehicle upon successful startup of the set of hardware and/or software modules.

10. The method of claim 1, wherein determining a profile, transmitting the startup command, monitoring the states, determining if the particular subset of hardware and/or software modules have successfully started up, and initiating the localization procedure are performed substantially simultaneously for each of a plurality of vehicles.

11. The method of claim 10, wherein the plurality of vehicles are a plurality of autonomous vehicles, and further comprising:
displaying at control system remote from the plurality of autonomous vehicles, on a graphical user interface a list that includes the plurality of autonomous vehicles; and
receiving user operator selection from the graphical user interface of the plurality of autonomous vehicles in the list;
wherein determining a profile, transmitting the startup command, monitoring the states, determining if the particular subset of hardware and/or software modules have successfully started up, and initiating the localization procedure are performed substantially simultaneously the plurality of autonomous vehicles.

12. A method for remotely starting up a vehicle, comprising:
- determining a profile that indicates a set of hardware and/or software modules on the vehicle to be started according to one or more jobs configured for the vehicle, and the vehicle having a configuration that includes a calibration profile used to determine a number and types of one or more sensors deployed on the vehicle for use in connection with a given job of the one or more jobs;
- transmitting to the vehicle a startup command to initiate startup of the vehicle, the startup command including the profile to be loaded by the vehicle and causing the vehicle to start up the set of hardware and/or software modules on the vehicle in a particular order, wherein the particular order for starting up the set of hardware and/or software modules is based on functional dependencies among the hardware and/or software modules;
- monitoring states of the set of hardware and/or software modules as they are started up, wherein monitoring includes obtaining status reports indicating one or more errors associated with starting up one or more of the hardware and/or software modules, wherein the status reports indicate one or more errors associated with starting up one or more of the hardware and/or software modules;
- determining one or more resolutions for the one or more errors based on data accumulated over time associated with starting up the set of hardware and/or software modules of vehicles, wherein determining the one or more resolutions for the one or more errors is based on attributes of the vehicle including: software version running on the vehicle, the configuration of the vehicle, historical patterns, and vehicle type; and
- transmitting to the vehicle, one or more error resolution commands that cause correction of the one or more errors in the one or more hardware and/or software modules of the vehicle;
- wherein the vehicle is one of a plurality of vehicles, the method further comprising:
  - providing a vehicle command publish/subscribe (pub/sub) function and a vehicle data pub/sub function for each of the plurality of vehicles; and
  - receiving periodic status updates for a given vehicle of the plurality of vehicles via a corresponding vehicle data pub/sub function for the given vehicle.

13. The method of claim 12, wherein determining a profile, transmitting the startup command, monitoring the states, determining the one or more resolutions, and transmitting the one or more error resolution commands are performed at a control system remote from the vehicle.

14. The method of claim 13, further comprising:
- displaying to a user operator at the control system, information associated with the one or more resolutions for the one or more errors; and
- wherein transmitting the one or more error resolution commands is responsive to input from the user operator at the control system.

15. The method of claim 13, wherein transmitting the one or more error resolution commands is performed automatically to cause resolution of the one or more errors in the one or more hardware and/or software modules of the vehicle.

16. The method of claim 13, wherein the vehicle is an autonomous vehicle, and wherein determining the one or more resolutions is performed based further on statistical knowledge built up over time, or using machine learning techniques, to determine an error resolution with a highest likelihood of success for a given error.

17. A system comprising:
- a plurality of vehicles; and
- a control system remote from, and in communication with, the plurality of vehicles, the control system configured to:
  - determine a profile that indicates a set of hardware and/or software modules on each vehicle of the plurality of vehicles to be started according to one or more jobs configured for each vehicle, and the vehicle having a configuration that includes a calibration profile used to determine a number and types of one or more sensors deployed on the vehicle for use in connection with a given job of the one or more jobs;
  - send, in response to user input, to each vehicle of the plurality of vehicles, a startup command to initiate startup of each vehicle of the plurality of vehicles, the startup command including the profile to be loaded by a respective vehicle of the plurality of vehicles and causing each respective vehicle to start up the set of hardware and/or software modules, according to the profile for the respective vehicle, on each respective vehicle in a particular order, wherein the particular order for starting up the set of hardware and/or software modules is based on functional dependencies among the hardware and/or software modules;
  - monitor states of the set of hardware and/or software modules as they are started up, including obtaining status reports indicating one or more errors associated with starting up one or more of the hardware and/or software modules in one or more vehicles of the plurality of vehicles, wherein the status reports indicate one or more errors associated with starting up one or more of the hardware and/or software modules;
  - determine one or more resolutions for the one or more errors based on data accumulated over time associated with starting up the set of hardware and/or software modules of the plurality of vehicles, wherein the one or more resolutions for the one or more errors is determined based on attributes of the vehicle including: software version running on the vehicle, the configuration of the vehicle, historical patterns, and vehicle type;
  - send to the one or more vehicles that reported one or more errors, one or more error resolution commands that cause correction of the one or more errors in the one or more hardware and/or software modules of the one or more vehicles;
  - provide a vehicle command publish/subscribe (pub/sub) function and a vehicle data pub/sub function for each of the plurality of vehicles; and
  - receive periodic status updates for a given vehicle of the plurality of vehicles via a corresponding vehicle data pub/sub function for the given week.

18. The system of claim 17, wherein the control system is further configured to:
- present, in a user interface to a user operator, a listing of vehicles to be started up, wherein the listing includes the plurality of vehicles;
- obtain user input from the user operator, via the user interface, of a selection of the plurality of vehicles to be started up; and receive a single user input command to initiate, substantially simultaneously, startup of the plurality of vehicles.

19. The system of claim 17, wherein the control system is further configured to:
    display to a user operator, information associated with the one or more resolutions for the one or more errors; and
    send to the one or more vehicles, the one or more error resolution commands, in response to input from the user operator.

20. The system of claim 17, wherein the control system is configured to:
    automatically send to the one or more vehicles, the one or more error resolution commands.

21. The system of claim 17, wherein the control system is configured to:
    determine the one or more resolutions based further on statistical knowledge built up over time, or using machine learning techniques, to determine an error resolution with a highest likelihood of success for a given error.

22. The system of claim 17, wherein the plurality of vehicles are a plurality of autonomous vehicles.

23. The system of claim 17, wherein the calibration profile further includes output of a calibration process used to determine offsets and biases of each of the one or more sensors on a given vehicle of the plurality of vehicles.

24. The system of claim 17, wherein the calibration profile further includes output of a calibration process used to determine offsets and/or biases of each of the one or more sensors on one or more of the plurality of vehicles.

* * * * *